US012705043B2

(12) United States Patent

Mesde et al.

(10) Patent No.: US 12,705,043 B2

(45) Date of Patent: Aug. 11, 2026

(54) VEHICLE SOFTWARE DEPLOYMENT SERVICE

(71) Applicant: Amazon Technologies, Inc., Seattle, WA (US)

(72) Inventors: Roland Mesde, Cupertino, CA (US); Michael Kenneth Dosenbach, Renton, WA (US); Alex Bessonov, San Jose, CA (US); David Joseph Mifsud, Lake Stevens, WA (US); George Sherif Kamal Hanna, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 18/334,716

(22) Filed: Jun. 14, 2023

(65) Prior Publication Data

US 2024/0419429 A1 Dec. 19, 2024

(51) Int. Cl.

| | |
|---|---|
| ***G06F 9/445*** | (2018.01) |
| ***G06F 8/65*** | (2018.01) |
| *B60R 16/023* | (2006.01) |

(52) U.S. Cl.

CPC ............ *G06F 8/65* (2013.01); *B60R 16/0231* (2013.01)

(58) Field of Classification Search

CPC ..... G06F 8/65; G06F 8/71; G06F 8/61; G06F 8/60; G06F 9/4881; H04L 67/34; H04L 67/125; H04L 41/5054; H04L 45/563; H04L 63/00; H04L 67/50; H04L 61/5076; H04L 51/58; H04L 45/56; H04L 43/14; B60R 16/023; B60R 2325/205; B60R 2021/01286; B60R 16/0231; H04W 4/40; H04W 84/12

See application file for complete search history.

(56) References Cited

U.S. PATENT DOCUMENTS

| | | | |
|---|---|---|---|
| 8,719,782 | B2 | 5/2014 | DeHaan |
| 9,170,798 | B2 | 10/2015 | Nagaraja et al. |

(Continued)

FOREIGN PATENT DOCUMENTS

| | | | |
|---|---|---|---|
| CN | 110704083 | A | 1/2020 |
| CN | 110955444 | A | 4/2020 |
| CN | 113741939 | A | 12/2021 |

OTHER PUBLICATIONS

U.S. Appl. No. 18/344,671, filed Jun. 29, 2023, Francesco Piai, et al.

(Continued)

*Primary Examiner* — Chuck O Kendall

(74) *Attorney, Agent, or Firm* — Alexander A. Knapp; Kowert, Hood, Munyon, Rankin & Goetzel, P.C.

(57) ABSTRACT

A vehicle software deployment management system generates a modifiable deployment plan and one or more associated vehicle software modules that is sent to an edge device at a vehicle activity site. The edge device stores the modifiable deployment plan and the one or more vehicle software modules for updating a given vehicle at a future time. In some embodiments, the vehicle may have insufficient network connectivity to perform the update remotely from the vehicle activity site. In some embodiments, the modifiable deployment plan may be modified by the edge device at the future time when the vehicle is present at the vehicle activity site, based on vehicle information obtained by the edge device and based on vehicle user/technician input obtained by the edge device.

20 Claims, 12 Drawing Sheets

(56) References Cited

U.S. PATENT DOCUMENTS

| | | | | |
|---|---|---|---|---|
| 9,880,837 | B2 | 1/2018 | Khazanchi et al. | |
| 10,554,637 | B1 | 2/2020 | Bendersky et al. | |
| 11,314,495 | B2 | 4/2022 | Francis | |
| 11,645,282 | B1 | 5/2023 | Garcia et al. | |
| 2018/0339712 | A1* | 11/2018 | Kislovskiy | H04L 67/34 |
| 2019/0384870 | A1 | 12/2019 | Shiraishi et al. | |
| 2020/0218531 | A1* | 7/2020 | Kushwaha | G06F 8/66 |
| 2022/0078077 | A1 | 3/2022 | Mifsud | |
| 2022/0171613 | A1 | 6/2022 | Goto | |
| 2022/0237958 | A1 | 7/2022 | Tzamaloukas et al. | |
| 2022/0317986 | A1 | 10/2022 | Francis et al. | |
| 2023/0161583 | A1* | 5/2023 | Fang | B60R 16/023 701/36 |

OTHER PUBLICATIONS

International Search Report and Written Opinion mailed Sep. 9, 2024 in PCT/US2024/032435, Amazon Technologies, Inc., pp. 1-12.

Stefan Boschert, "Next Generation Digital Twin," Conference Paper May 2018, ResearchGate, in Proceedings of TMCE 2018, pp. 209-218.

U.S. Appl. No. 17/710,585, filed Mar. 31, 2022, Roland Mesde, et al.

U.S. Appl. No. 17/710,634, filed Mar. 31, 2022, Roland Mesde, et al.

U.S. Appl. No. 17/710,644, filed Mar. 31, 2022, Roland Mesde, et al.

U.S. Appl. No. 17/806,434, filed Jun. 10, 2022, Roland Mesde, et al.

U.S. Appl. No. 17/809,878, filed Jun. 29, 2022, Roland Mesde, et al.

U.S. Appl. No. 17/809,868, filed Jun. 29, 2022, Roland Mesde, et al.

U.S. Appl. No. 17/710,551, filed Mar. 31, 2022, Rloand Mesde, et al.

U.S. Appl. No. 17/810,301, filed Jun. 30, 2022, Roland Mesde, et al.

U.S. Appl. No. 18/334,716, filed Jun. 14, 2023, Roland Mesde, et al.

International Search Report and Written Opinion mailed Mar. 19, 2024 in PCT/US2023/082693, Amazon Technologies, Inc., pp. 1-12.

* cited by examiner

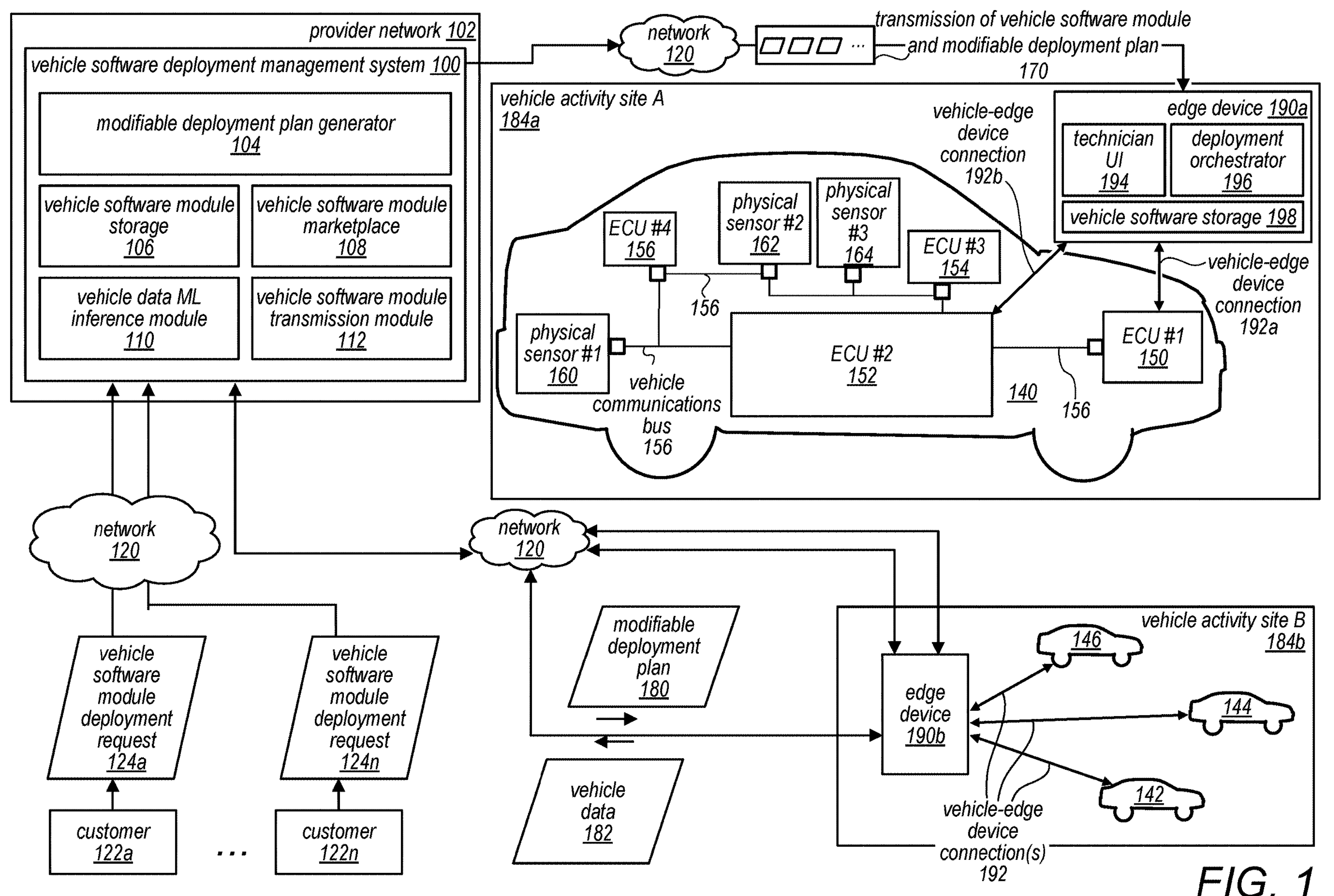
provider network 102
vehicle software deployment management system 100
modifiable deployment plan generator 104
vehicle software module storage 106
vehicle software module marketplace 108
vehicle data ML inference module 110
vehicle software module transmission module 112
network 120
transmission of vehicle software module and modifiable deployment plan 170
vehicle activity site A 184a
edge device 190a
technician UI 194
deployment orchestrator 196
vehicle software storage 198
vehicle-edge device connection 192b
vehicle-edge device connection 192a
ECU #4 156
physical sensor #2 162
physical sensor #3 164
ECU #3 154
156
physical sensor #1 160
vehicle communications bus 156
ECU #2 152
140
156
ECU #1 150
network 120
network 120
vehicle software module deployment request 124a
vehicle software module deployment request 124n
customer 122a
...
customer 122n
modifiable deployment plan 180
vehicle data 182
vehicle activity site B 184b
edge device 190b
146
144
142
vehicle-edge device connection(s) 192
FIG. 1

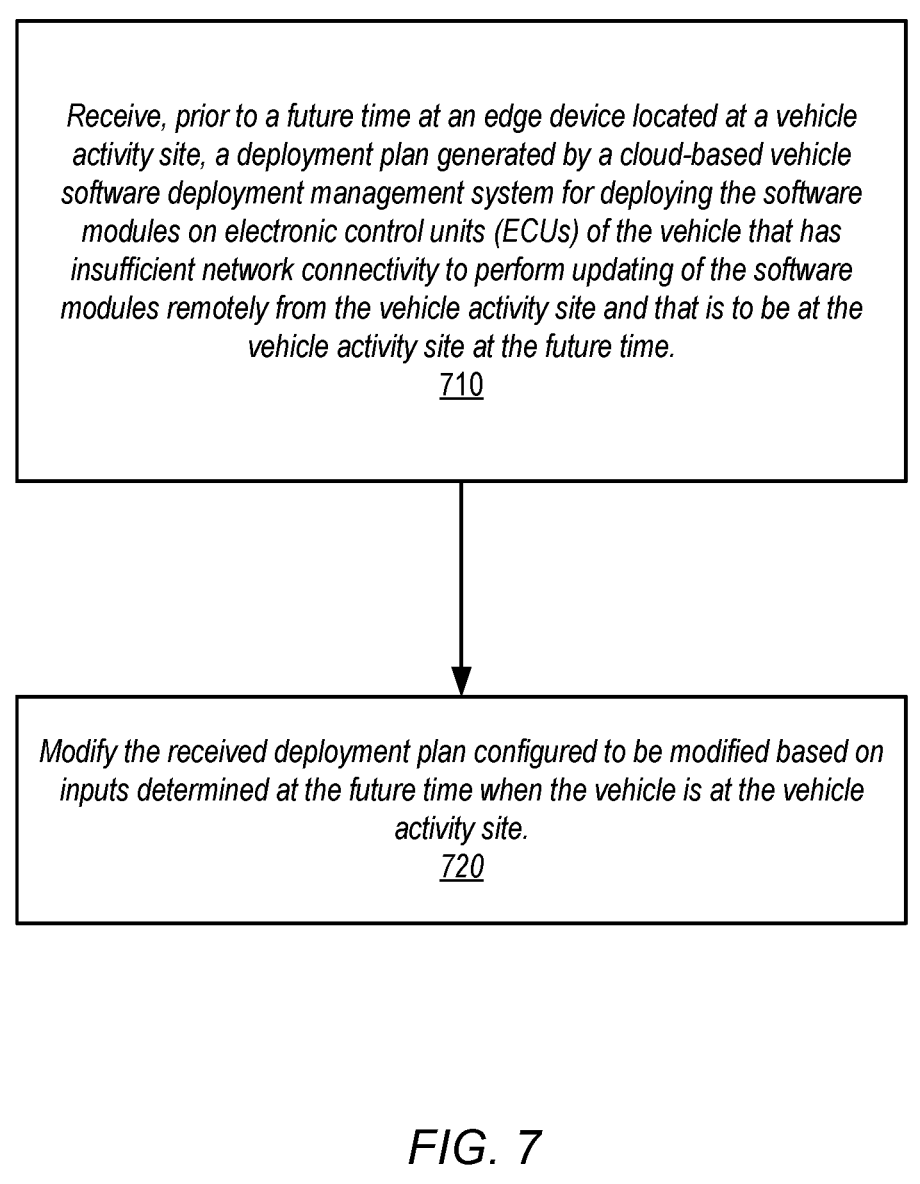

*Receive, prior to a future time at an edge device located at a vehicle activity site, a deployment plan generated by a cloud-based vehicle software deployment management system for deploying the software modules on electronic control units (ECUs) of the vehicle that has insufficient network connectivity to perform updating of the software modules remotely from the vehicle activity site and that is to be at the vehicle activity site at the future time.*
710

*Modify the received deployment plan configured to be modified based on inputs determined at the future time when the vehicle is at the vehicle activity site.*
720

*FIG. 7*

VEHICLE SOFTWARE DEPLOYMENT SERVICE

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicles. Some vehicles may include multiple electronic control units (ECUs) and various sensor modalities. Additionally, deployment of a vehicle software module may require that the vehicle software module be compatible with an execution environment of a particular ECU that the vehicle software module will be deployed in. Moreover, limited network connections available to a vehicle may restrict or slowdown the transfer of a software module to a vehicle.

BRIEF DESCRIPTION OF THE DRAWINGS

FIG. 1 illustrates a cloud-based vehicle software deployment management system that generates a modifiable deployment plan for deploying a software module and illustrates sending the modifiable deployment plan/software module to an edge device at a vehicle activity site, wherein an electronic control unit (ECU) of a vehicle is to be updated at the activity site at a future time and the vehicle has insufficient network connectivity to perform the update remotely from the vehicle activity site, according to some embodiments.

FIG. 7 illustrates a flowchart of operations performed by an edge device that receives and modifies a vehicle software module and/or modifies a modifiable deployment plan for updating the ECU of a vehicle at a future time, wherein the vehicle has insufficient network connectivity to perform the updating of an ECU of the vehicle remotely from the vehicle activity site, according to some embodiments.

Figure 2A:
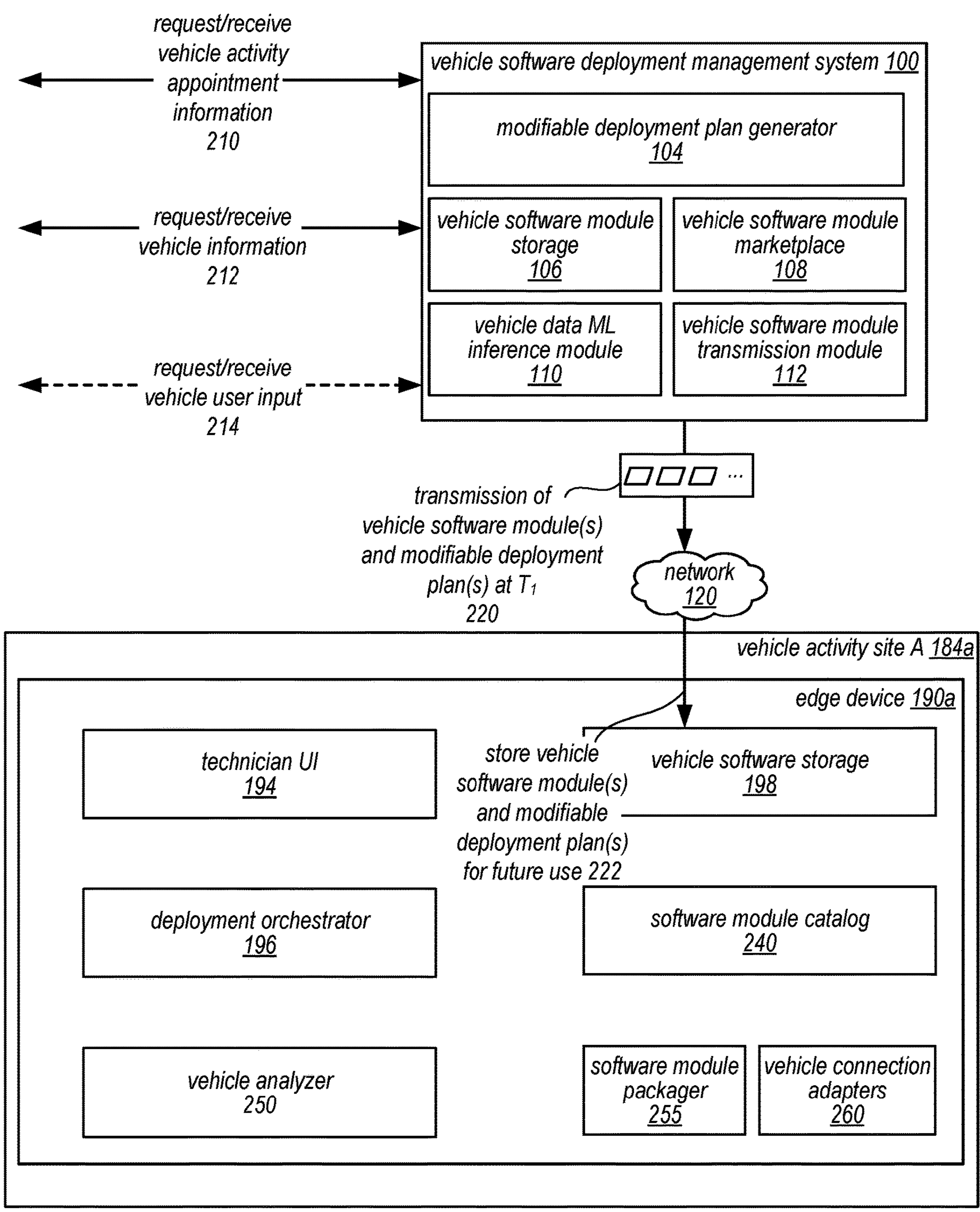
FIG. 2A illustrates a more detailed view of a cloud-based vehicle software deployment management system and an edge device located at a vehicle activity site that stores a vehicle software module and a modifiable deployment plan generated by the cloud-based vehicle software deployment management system for future use in servicing a vehicle, wherein the vehicle has insufficient network connectivity to perform the updating of an ECU of the vehicle remotely from the vehicle activity site, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a cloud-based vehicle software deployment management system that generates a modifiable deployment plan for deploying one or more software modules onto a vehicle using an edge device located at a vehicle activity center. The cloud-based vehicle software deployment management system is communicatively coupled, via a network connection, with edge devices located at vehicle activity sites, such as vehicle service centers, vehicle charging stations, vehicle sales centers, vehicle storage locations, etc. An edge device located at a vehicle activity center receives, from the cloud-based vehicle software deployment management system, a modifiable deployment plan to deploy to a vehicle at a future time, wherein the vehicle has insufficient network connectivity to update electronic control units (ECUs) of the vehicle remotely from the vehicle activity site. The cloud-based vehicle software deployment management system may be configured to generate, prior to a future time that the vehicle is scheduled to be at the activity site (or prior to a future time that the vehicle is scheduled to be connected to the edge device), the modifiable deployment plan for deploying one or more software modules on the ECUs of the vehicle. The one or more software modules may be deployed to one or more ECUs of the vehicle using a connection established between the edge device located at the vehicle activity site and the vehicle. A deployment orchestrator of the edge device may be configured to modify the deployment plan based on one or more inputs determined at the future time when the vehicle is connected to the edge device at the vehicle activity site.

For example, there may be vehicles that do not have sufficient network connectivity to perform updates remotely from a vehicle activity site (as is the case in many older vehicles). Unlike vehicles that have sufficient network connectivity for receiving updates for their respective ECU remotely away from the vehicle activity site via wireless communications such as Wi-Fi, cellular networks, etc., these limited-connectivity vehicles may require a technician (or a vehicle user) to physically connect a connector into a port of the vehicle to deploy software. For example, a connector connected to the edge device (via a cable or wirelessly) may be connected to one or more vehicle ports to manually establish a connection to the vehicle ECUs in order to deploy the one or more software modules. For example, older vehicles may not have the necessary hardware or software to support over-the-air (OTA) updates, which are commonly used to update vehicles wirelessly over the internet or using cellular networks. As a result, updating a vehicle with limited network connectivity may require physical access to the vehicle's computer system in order to establish sufficient network connectivity to perform an update. In another example, despite a vehicle being equipped with wireless communications capability, the vehicle may nevertheless be found to have insufficient connectivity to download software updates remotely from the vehicle activity site due to other reasons, such as cost of transferring data over a cellular network. In some embodiments, the vehicle may have insufficient connectivity to download software updates due to a vehicle user decision to opt out of updating software away from a vehicle activity site. Once sufficient network connectivity is established at a vehicle activity site, a deployment plan and necessary software modules may be deployed to the vehicle. The deployed deployment plan and software modules may be used to update the ECUs of the vehicle. However, downloading files on demand when the vehicle is at the activity site subsequent to establishing connection to the vehicle (e.g., just-in-time (JIT) downloading), may have some drawbacks compared to caching software modules beforehand (e.g., "pre-fetching" or "pre-pushing" the software modules to the edge and storing the pre-fetched or pre-pushed software modules). For example, JIT downloading of deployment plans and software modules may lead to increased service times for vehicle users as the software modules/deployment plans would first be required to be downloaded to the vehicle activity site before they can be deployed to the ECUs of vehicles located at the vehicle activity sites. For example, obtaining all of the relevant files for a given update may take hours and may extend vehicle service times. The additional extension of the vehicle service time may negatively impact customer experience. Moreover, the time it takes to download a deployment plan and associated software modules may further be exacerbated in activity sites where the network/internet speed is slow or unreliable. Additionally, such on demand downloading of a deployment plan and software modules may contribute to network congestion at the activity site (as there may be multiple vehicles being updated at the same time in the same activity site) that may further increase the service times and hinder activity site operations.

Using an edge device that pre-fetches and/or caches a required deployment plan and relevant software modules ahead of time may decrease service times and avoid contributing to network congestion. However, there may be challenges to pre-fetching or pre-pushing and storing the deployment plans/relevant software modules in the edge device at the vehicle activity site. For example, because there are numerous software modules for different types of ECUs the edge device may not be able to store all of the possible software modules that may be used. Even if available software modules are limited to those that occur for a single vehicle model, there may still not be enough storage space available to cache all of the available software modules as there may be a large number of customizations of hardware and/or vehicle configuration options for a given vehicle that considerably increase the variety of software modules that may be deployed to the given vehicle. The large number of variations of vehicles, both within a given make and model, and between different makes and different models, may make determining a deployment plan for a specific vehicle difficult. For example, two vehicles of the same make and model may nevertheless be equipped with different features such as different infotainment systems, different driver-assist systems, different automated-braking systems, etc., that were customized to suit the individual needs of the drivers (or purchasers) of the two vehicles of the same make and model. Accordingly, the various combination of ECUs that support the different features would require different deployment plans and software modules relevant to the different deployment plans. Also, there may be different versions of the vehicle software wherein one vehicle may have received the latest update for an ECU, whereas the same ECU for a second vehicle may not have yet received an earlier update. Moreover, a deployment plan may be different depending on the various combinations of vehicle hardware/software present on a given vehicle. Even though the edge device may be configured to store a large number of different software modules, the edge device may nevertheless be unable to pre-fetch or pre-push and store all software modules for all deployment plans for all the potential permutations of deployment plans and required software module needed to update a fleet of vehicles. Moreover, in some limited cases, for a given vehicle an exact ECU configuration and/or user input for determining a user selected update may not be available until the vehicle is physically located at the activity site at a future time, and thus the edge device may not be able to anticipate and store software modules that accommodate all potential ECU configurations or all possible user selected decisions.

As can be seen, updating software on vehicles with insufficient network connectivity to perform software deployments remotely from a vehicle activity site encompasses accommodating a wide range of combinations of vehicle hardware and software and presents a non-trivial challenge.

In some embodiments, a cloud-based vehicle software deployment management system may generate a modifiable deployment plan and an edge device at a vehicle activity site may store the modifiable deployment plan (and associated software modules) for use at a later time when the vehicle that has insufficient network connectivity is connected to the edge device at the vehicle activity center. In contrast to generating an entirely new deployment plan and downloading the associated software modules after the vehicle is at the vehicle activity site, the cloud-based vehicle software deployment management system may generate a modifiable deployment plan, provide the modifiable deployment plan (and associated software modules) to the edge device located at the vehicle activity site prior to the vehicle arriving at the vehicle activity site, and the edge device may store the modifiable deployment plan along with the associated software modules before the vehicle is at the vehicle activity site. Theis may reduce download times and provide a faster service experience. Downloading or otherwise transferring the required modifiable deployment plan and software modules ahead of time and in a spaced-out manner may reduce network congestion at the time of service of the vehicle, as the files are acquired in advance. For example, if a given vehicle activity site services a large number of vehicles during the day and services only a few vehicles at night, network bandwidth can be more efficiently used by spreading out the network usage over both the day and the night by pre-fetching deployment plans and associated software modules in a coordinated manner, as opposed to attempting to download a significant portion of the day's needed deployment plans and associated software modules at the same time during peak hours of activity at the vehicle activity site during the day. Moreover, the modifiable deployment plan may allow the deployment plan to be modified at the time of service at the vehicle activity site and tailor the update of the vehicle ECUs based on the specific vehicle type as well as incorporate vehicle user/technician input and other vehicle information (which may not have been available at the cloud-based vehicle software deployment management system prior to the servicing at the activity site). For example, specific vehicle configurations may require a physical connection to a port of the vehicle to be established, which inhibits the cloud-based vehicle software deployment management system from accounting for these specific vehicle configurations. Thus, a modifiable deployment plan may define various aspects of deployment but may also accommodate in-the-field modifications based on information that was not available in the cloud due to the need for a physical connection or the need for user/owner input.

In some embodiments, the modifiable deployment plan may be generated based on vehicle information, such as vehicle make, model, and custom features, obtained prior to the servicing of the vehicle at the vehicle activity site. In some embodiments, the modifiable deployment plan may be a modifiable deployment plan for multiple vehicles. In some embodiments, the cloud-based vehicle software deployment management system may generate the modifiable deployment plan based on receiving/obtaining an indication that a vehicle activity site appointment has been scheduled for the vehicle at a specific vehicle activity site. For example, a user of the vehicle may schedule a service appointment with a vehicle service center or may schedule to charge the vehicle at a charging station, both of which may be types of vehicle activity sites that include edge computing devices as described herein. The cloud-based vehicle software deployment management system may generate a modifiable deployment plan before the date and/or time of the scheduled vehicle activity site appointment. The cloud-based vehicle software deployment management system may send the generated modifiable deployment plan to an edge device, wherein the edge device is connected to the cloud-based vehicle software deployment management system. The generated modifiable deployment plan sent to the edge device may be stored for future use at the vehicle activity site indicated in the scheduled appointment. In some embodiments, the modifiable deployment plan may be modified based on vehicle user/technician input received at the vehicle activity site. For example, the vehicle user may determine which ones of a number of available updates to perform on the vehicle. In some embodiments, the updates may be associated with up-sell options and/or cross-sell options.

In some embodiments, the edge device located at the activity site may be configured to be connected to the vehicle using various connection interfaces. For example, the edge device may interface with a vehicle software update/diagnostics mechanisms, such as a flash port, an on-board diagnostic system (ODB) port and/or IEEE 802.11b Direct Sequence "Wi-Fi". In some embodiments, the edge device may be a hardware device having a secured connection to the cloud-based vehicle software deployment management system. The edge device may obtain vehicle information, such as a quantity of ECUs in the vehicle and types of ECUs in the vehicle, latest software module versions installed on the ECUs, etc. and modify the stored modifiable deployment plan taking into account these configuration details. In some embodiments, the modifications to the stored deployment plan may include an update of one or more portions of the vehicle software module and/or an update to the modifiable deployment plan, wherein the modifications are based on received vehicle information and/or vehicle user/technician input. For example, the edge device may obtain information about a vehicle configuration of a customized ECU of an infotainment system, and based on the customization, determine that a software module for the infotainment system may not be installed. In another example, based on the determination that an ECU for an automated braking system contains additional computing capacity, the edge device may obtain a new more processing-intensive version of the software module to be deployed to the ECU. Based on the vehicle configuration and technician/user input, one or more inputs triggering one or more modifications to the deployment plan may be provided to the edge device to use in modifying the modifiable deployment plan.

FIG. 1 illustrates a cloud-based vehicle software deployment management system that generates a modifiable deployment plan for deploying a software module and illustrates sending the modifiable deployment plan/software module to an edge device at a activity site, wherein an electronic control unit (ECU) of a vehicle is to be updated at the activity site at a future time and the vehicle has insufficient network connectivity to perform the update remotely from the vehicle activity site, according to some embodiments.

In some embodiments, the vehicle software deployment management system may be a cloud-based system included in a provider network, such as provider network 102. The provider network 102 may include data centers, networking infrastructure, etc. configured to provide cloud-based services. In some embodiments, the provider network 102 may be set up by an entity such as a company or a public sector organization to provide one or more services (such as various types of cloud-based services) accessible via the Internet and/or other networks. In some embodiments, the cloud-based system may be included in a private provider network that is established within the service provider's data center for private use. The private provider network may be isolated from other users and may provide dedicated connectivity and resources for the service provider's private use, such as in a virtual private cloud. In some embodiments, the cloud-based system may be included in a public provider network that is shared among multiple tenants or organizations within a cloud service provider's data center. The "cloud-based" vehicle software deployment management system may be implemented in a public provider network or a private provider network, as well as a virtual private network included in a public provider network. In some embodiments, the vehicle software deployment management system may be partially implemented in both of the private and public provider networks. The provider network 102 may be implemented in a single location or may be implemented in multiple data centers hosting various resource pools, such as collections of physical and/or virtualized computer servers, storage devices, networking equipment and the like (e.g., provider network 102 may include multiple computing systems 900 described below with regard to FIG. 9), needed to implement and distribute the infrastructure and services offered by the provider network 102, including the vehicle software deployment management system 100.

The provider network 102 may deliver content from points of presence outside of, but networked with, data centers of the provider network 100 by way of edge locations. Such points of presence at edge locations may be referred to herein as edge devices 190, wherein the point of presence location is a vehicle activity site, which may include vehicle service centers, vehicle charging stations, vehicle storage facilities, vehicle parking facilities, vehicle sells centers, etc. In some embodiments, a given one of the edge devices 190 may be a set of one or more servers provided to a customer's premises (such as a vehicle activity site) which can be controlled, at least in part, by a control plane of the provider network 102. For example, an edge device 190*a* may be located at an activity site A 184*b* and an edge device 190*b* may be located at an activity site B 184*b*, and may be controlled by a control plane of provider network 102, such as a control plane of a virtualized computing service of provider network 102. Also, in some embodiments the edge devices 190*a* and 190*b* may be connected to the provider network, for example via a physical network cable, such as a dedicated direct connection, or via a public network connection, such as the internet. In some embodiments, the edge devices 190*a* and 190*b* may be connected to the provider network 102 without being included in a control plane of the provider network. In either configuration, the edge devices 190*a* and 190*b* may cache modifiable deployment plans 170 and 180 (including their associated software modules) prior to vehicles, such as vehicles 140, 142, 144, 146, etc. arriving at a given one of vehicle activity site A (184*a*) and vehicle activity site B (184*b*).

In some embodiments, a vehicle activity site, such as vehicle activity site A (184*a*) and vehicle activity site B (184*b*) may be a vehicle service center. The vehicle service center may provide maintenance, repair, and other services for vehicles, including various software updates for vehicle ECUs. In some embodiments, a vehicle service center may be staffed by trained technicians and may be equipped with specialized tools and equipment to diagnose, repair, and service vehicles of various makes and models. In some embodiments, an activity site may be a charging station for electric vehicles (EVs), for example to recharge their batteries. For example, the activity site A 184*b* may include charging infrastructure, such as electric vehicle supply equipment (EVSE) or charging stations equipped with charging connectors compatible with various types of EVs, and may provide the necessary electrical power to recharge the EV's battery.

In some embodiments, the edge devices 190*a* and 190*b* at the activity sites A/B 184*a* and 184*b* may be connected to vehicles 140, 142, 144, and 146. Although FIG. 1 illustrates three vehicles 142, 144, and 146 connected to the edge device 190*b*, via vehicle-edge device connection(s) 192, various other numbers of vehicles may be concurrently connected to the edge device 190*b*. For example, this illustration is intended only as an example and it should be understood that any number of vehicles may be connected to the edge device 190*b*. Furthermore, in some embodiments, there may be any number of vehicle activity sites, such as vehicle activity site A 184*a* and vehicle activity site B 184*b*, wherein the edge devices 190*a* and 190*b* may respectively be located. Also, in some embodiments more than one edge device may be located at a given vehicle activity site. For example, multiple edge devices may be located in respective activity sites A/B 184*a* and 184*b*. In some embodiments, network 120 may be accessible to edge device 190. Also, edge device 190 may contain various components configured to send and receive signals using different vehicle signal formats such as vehicle connection adapters (further discussed in FIGS. 2A-2C). In some embodiments, the edge devices 190*a* and 190*b*, at the vehicle activity sites 184*a* and 184*b* may provide connection with a vehicle using a dual power and data connection. The edge device 190 may provide both network power and network connectivity. Also, in some embodiments, a single adaptor may connect a power supply line used for charging as well as connecting power and data connections used to connect the edge device 190 to a given vehicle Customers 122*a* through 122*n* may furthermore, communicate with the vehicle software deployment management system 100 via the network 120. Customers 122*a* through 122*n* may be vehicle suppliers or vehicle component suppliers (e.g., vehicle original equipment manufacturers (OEMs) and/or parts suppliers). The network 120 may be a private or public network such as a direct connect connection to a service provider network hosting the vehicle software deployment management system 100, or an Internet connection. Network 120 may furthermore be a wireless network, such as a cellular network, Wi-Fi network or other wireless network. In some embodiments the vehicles 140, 142, 144, and 146 may be connected to multiple types of networks 120 and not just to one type of network 120.

In some embodiments, the vehicle software deployment management system 100 may include a modifiable deployment plan generator 104, a vehicle application storage 106 configured to store software modules usable in deployment plans generated by modifiable deployment plan generator 104, a vehicle application marketplace 108, a vehicle data ML inference module 110, and a vehicle application transmission module 112. The modifiable deployment plan generator 104 may generate a modifiable deployment plan 180 for a single vehicle, such as the vehicle 142, or a fleet of vehicles 140, 142, 144, and 146 based on the vehicle application deployment requests 124*a*-124*n*, respectively sent by the customers 122*a* through 122*n*. For example, the customer 122*a* may send vehicle application deployment request 124*a* requesting that an updated automatic braking software module be deployed to vehicle 140. In some embodiments, the vehicle software module deployment request 124*a*, may request deployment of a software module in varying levels of generality, such as requesting an update to all of the ECUs as determined by the vehicle software deployment management system or requesting an update to a safety feature of the vehicle without specifying a specific ECU that a software module is to be deployed on.

With regard to a vehicle software module that is to be deployed, the modifiable deployment plan generator 104 may obtain or reference one or more vehicle software modules stored in vehicle application storage 106, an external application storage, and/or directly from the customer 122. The obtained or referenced software modules may be included with or in a modifiable deployment plan being generated by the modifiable deployment plan generator 104. In some embodiments, a modifiable deployment plan may instruct specific ones of the software module component to be deployed at specific ECUs. Also, the deployment plan or the software modules may be modified at an edge device (or another receiving agent). The modifiable deployment plan may include necessary software packages required for the vehicles to deploy the software modules, including information indicating various software dependencies. In some embodiments, the modifiable deployment plan may further include operational procedures for a technician to deploy the software module(s) in a correct sequence, as well as testing and validation procedures. The modifiable deployment plan generator 104 and generation of the modifiable deployment plan will be further discussed in FIGS. 2A-2C. In some embodiments, the vehicle application marketplace 108 may expose various vehicle applications allowed to be deployed to a given vehicle for the customers 122*a*-122*n*. The customers 122*a*-122*n* may indicate in a vehicle application deployment request a particular application to deploy to the vehicle. Although not illustrated, in some embodiments, a control plane of the vehicle software deployment management system 100 may register vehicles, model vehicles (e.g., manage vehicle shadows), and manage data for a single vehicle or across a fleet of vehicles. In some embodiments, the control plane of the vehicle software deployment management system 100 may allow customers 122*a*-122*n* to perform various actions required to deploy one or more vehicle software module as well as update the deployment plans via the edge device 190*a*-*b*.

For example, the modifiable deployment plan generator 104 may generate a modifiable deployment plan and associated vehicle software modules that may be stored by the edge device 190*a* at activity site A 184*a*. The edge device 190*a* may include software and or networking connections for providing a technician user interface (UI) 194, a deployment orchestrator 196, and a vehicle software storage 198. The edge device 190*a* may receive a transmission of a vehicle software module and a modifiable deployment plan 170 and store them in the vehicle software storage 198 for future deployment upon arrival of the vehicle 140 at the vehicle activity site A 184*a* for servicing. The edge device 190*a* may receive vehicle user input and/or technician input regarding updating the vehicle 140 via the technician UI 194 at a time when the vehicle 140 is present at the activity site A 184*a* (therefore the vehicle having sufficient network connectivity for update via the edge device). Based on the received user/technician input, the edge device may modify the deployment plan and deploy the software module(s) to ECU #1 150 and ECU #2 152 of the vehicle 140. In some embodiments, the ECU #1 150 and ECU #2 152 may include one or more subsystems that process deployment plans sent from the vehicle software deployment management system 100, and may create localized ECU execution plans based on metadata that are obtained from the ECUs in the vehicle through one or more ECU agents deployed at the ECUS. In some embodiments, the modifiable deployment plan 180 that has been sent to the vehicle may create one or more localized ECU execution plans that are then transmitted by ECU #1 150 to ECU #2 152. In some embodiments, the execution plans may be transmitted according to a specific sequence to the respective ECUs. For example, a particular installation sequence may have been used in testing to certify the vehicle software and it may be necessary to install the software modules in the same sequence as was used in testing in order to satisfy certification requirements. The vehicle application storage 106 and the vehicle application marketplace 108 will be further discussed in FIGS. 2A-2C and FIG. 4.

In some embodiments, the vehicle application transmission module 112 may provide a vehicle side software development kit (SDK) or other collection of software development package to interpret deployment plans (or other messages) and interpret a vehicle software module (including various file format of the software module and dependencies) for the vehicle 140. The vehicle application transmission module 112 may furthermore include a first-in-first-out (FIFO) type queue storing signed serialized data chunks that have been generated based on the modifiable deployment plan. The signed serialized data chunks may be formatted in a way (and the vehicle application transmission module may be configured in a way) to transmit the signed serialized data chunks such that the signed serialized data chunks can be relayed using any communication protocol/mechanism a customer prefers to use on the edge device 190. The vehicle application transmission module 112 may generate a set of signed serialized data chunks of only the vehicle software module, only the modifiable deployment plan, or both the deployment plan and the vehicle software module. In some embodiments, the chunks may be signed so as to enable verification by the edge devices that the received data chunks are sent by a correct entity. In some embodiments, a third-party application may utilize a cloud-side SDK to interact with the vehicle software deployment management system 100 and transmit the signed serialized data chunks to the edge device 190. The edge device 190 may incrementally reconstruct the deployment plan and software module packages to be used to implement a software module sent to the vehicle. In some embodiments, if a chunked transmission of the deployment plan and the associated software modules are received, the edge device 190 may incrementally reconstruct the deployment plan and the software module.

In some embodiments, a vehicle communications bus 156 of the vehicle 140 may transmit vehicle information sent from various components of the vehicle, such as electronic control unit 150 (ECU #1), electronic control unit 156 (ECU #4), and electronic control unit 154 (ECU #3). Additionally, other components, such as physical sensor #1 160, physical sensor #2 162, and physical sensor #3 164 may be connected to one or more of the vehicle communications buses 156 and/or ECUs of the vehicle. In some embodiments, the various physical sensors may include audio/visual sensors that obtain audio/visual information and may communicate such information over the vehicle communications bus 156. In some embodiments, the various physical sensors 160, 162, and 164 may include a location sensor that is able to obtain the location of the vehicle. In some embodiments, the location sensor may be a Global Positioning System (GPS)

using cellular, wireless passive, satellite, and other types of GPS systems. The location sensor may obtain location information that is further processed by the ECU #1 150 before being transmitted over the network to the vehicle software deployment management system 100. In some embodiments, the various physical sensors may be connected to multiple vehicle communications buses and/or physical sensors. For example, in the vehicle 140, physical sensor 162 (physical sensor #2) may be connected to ECU 156 (ECU #4) as well as ECU 156 (ECU #3) via the vehicle communications bus 156. Various vehicle communications bus 156 connections may provide alternate sensor signal paths. In some embodiments, various portions of the vehicle communication bus 156 may be different types of buses and/or buses that use different types in-vehicle communication protocols. The in-vehicle communications protocols used in the vehicle 140 may include a controller area network (CAN) protocol, a remote procedure call (RPC) protocol, a controller area network flexible data-rate (CAN FD) protocol, a low-speed CAN protocol, a high-speed CAN protocol, a Society of Automotive Engineers (SAE) J1939 protocol, a CANopen protocol, and/or an on-board diagnostics (OBD) protocol. The edge device 190 may be connected one or more components of the vehicle via one or more vehicle-edge device connections 192. For example, the edge device 190*a* may be connected to ECU #1 150 via a vehicle-edge device connection 192*a* and may be connected to ECU #2 152 via a vehicle-edge device connection 192*b*. The edge device 190*a* may deploy one or more software modules on the ECU #1 and/or ECU #2 using the vehicle-edge device connections 192*a* and 192*b*. In some embodiments, a vehicle-edge device connection to one component of a vehicle may allow deployment of a software module to another component of the vehicle. For example, the vehicle-edge device connection 192*b* formed between the edge device 190*a* and ECU #2 152 may allow the deployment orchestrator 196 to deploy the software module to ECU #3 154 that is connected to ECU #2. In some embodiments, the ECU #2 152 may receive the necessary deployment plan/software module packages and facilitate the deployment on the ECU #3.

The modifiable deployment plan generator 104 of the vehicle software deployment management system 100 may generate deployment plans that allow for modification or optimization of deployment configurations for deployment of one or more software modules onto the respective vehicles. For example, the modifiable deployment plan generator 104 may use a vehicle ECU configuration and diagnostic data, including deployment operation data (e.g., stage of failure of the deployment procedure), as well as an ML inference generated from vehicle data and other sources, to determine a modified or optimized configuration for deployment of an application on the vehicle. Using ML inferences to update the modifiable deployment is further discussed in FIG. 6. In some embodiments, the vehicle software deployment management system 100 may utilize the vehicle data 182 to reconstruct a representation or state of the vehicle in a vehicle simulator, such as a virtual replica of a vehicle. The reconstructed representation may be used to test various vehicle software modules including testing the deployment of the vehicle software module as further discussed in FIG. 5. Moreover, ECU #1 150 may use a deployment adapter interface to communicate with the different runtime environments to which software modules can be deployed in vehicle ECU partitions such as Autosar Classic, Autosar Adaptive, Android, OCI container frameworks, and/or WASM runtimes.

FIG. 2A illustrates a more detailed view of a cloud-based vehicle software deployment management system and an edge device located at a vehicle activity site that stores one or more vehicle software modules and a modifiable deployment plan generated by the cloud-based vehicle software deployment management system for future use in servicing a vehicle, wherein the vehicle has insufficient network connectivity to perform the updating of an ECU of the vehicle remotely from the vehicle activity site, according to some embodiments.

In some embodiments, the vehicle software deployment management system 100 may request/receive vehicle activity appointment information 210. In some embodiments, the vehicle activity appointment information may include one or more of a type of activity requested for the vehicle (e.g., specific type of update or features requested or specific ECU), appointment date, appointment time, and appointment location for the activity appointment. For example, the vehicle software deployment management system 100 may receive information about a vehicle service appointment that indicates that the vehicle 140 is scheduled to be serviced at activity site A 184 at future time $T_2$ to update ECU #1 150. In some embodiments, the activity appointment time may be a range of times in the future and/or an approximate time in the future. In some embodiments, the vehicle activity appointment information may include forecasts of vehicle appointments that are forecast to take place at the vehicle activity site without an explicit appointment for the vehicle already being established. For example, vehicle software deployment management system 100 may receive or generate a forecast regarding specific vehicles (or specific types of vehicles) that are forecast to arrive at a charging station at a future time. In some embodiments, the vehicle software deployment management system 100 may forecast arrival of the vehicles using the vehicle data ML inference module 110 as further discussed in FIG. 6. The forecast may serve as the vehicle activity appointment information that may be used by the vehicle software deployment management system 100 to determine the modifiable deployment plan to pre-cache at the edge device 190*a*. In some embodiments, the vehicle software deployment management system 100 may request/receive vehicle information 212, and may use the received vehicle information to generate a modifiable deployment plan. In some embodiments, the vehicle activity appointment may be appointment for vehicle charging at a vehicle charging station and/or time and duration for which the charging station is reserved. The vehicle information received may include make, model, year, and VIN (Vehicle Identification Number) of the vehicle 140 for which the vehicle activity is to be performed at the activity site A 184*a*. The vehicle information may include various other types of information, such as vehicle ECU configuration, vehicle software configuration, vehicle state information, various inferences derived from fleet-wide analysis, or other vehicle information pertinent to a generation of a vehicle deployment plan and may not be limited to the above examples of vehicle information. In some embodiments, the vehicle software deployment management system 100 may request/receive vehicle information 212 in multiple steps, and, in some embodiments, the vehicle software deployment management system 100 may obtain the information based on parts of the vehicle information received. For example, based on the vehicle VIN received, the vehicle software deployment management system 100 may request ECU information from an Original Equipment Manufacturer (OEM) that may use the VIN number to identify the specific ECU placed on the vehicle. In some embodiments, the vehicle software deployment management system 100 may request/receive vehicle user input 214 that may be used to generate a modifiable deployment plan. For example, the vehicle software deployment management system 100 may request vehicle user input regarding any modifications made to the hardware in the vehicle 140 by sending a notification to the user and receive input regarding specific vehicle configuration options. The vehicle user input may be used to narrow the scope of possible software modules available to be deployed in the modifiable deployment plan. In some embodiments, the vehicle information may be used to determine the notification to send to the vehicle user for the vehicle user input. Similarly, the vehicle user input received by the vehicle software deployment management system 100 may be used to request/receive additional ones of the vehicle information from various sources.

Based on the received appointment information, vehicle information, and/or the user input, the modifiable deployment plan generator 104 may generate a modifiable deployment plan. The modifiable deployment plan may include one or more variations of a deployment plan that may be used at a future time when the vehicle is present at the vehicle activity site. A modifiable deployment plan may include a set of predefined deployment strategies or approaches that can be modified or customized in the future based on vehicle user/technician input. In some embodiments, in addition to the vehicle user/technician input, the modifiable deployment plan may be modified based on vehicle information obtained when the vehicle is connected to an edge device. The deployment plan may include multiple strategies or options for deploying one or more different versions of a given software module. In some embodiments, the modifiable deployment plan may further include additional software dependencies required for deployment of the different versions. In some embodiments, the modifiable deployment plan may include provisions for testing and validation activities to ensure the quality and stability of the deployment, such as unit testing that may be modified later based on the user/technician input. A modifiable deployment plan may provide flexibility and adaptability during the deployment process (in the absence of certain vehicle information and/or user input) and may allow the deployment plan and software module to be pre-cached at a vehicle activity site location without having all of the necessary information needed for actual deployment. The vehicle software deployment management system 100 may provide transmission of vehicle software module(s) and modifiable deployment plan(s) at $T_1$ 220 and the vehicle software storage 198 may store vehicle software modules and modifiable deployment plans for future use 222 without vehicle information and/or user input needed for deployment as shown in FIG. 2B.

Figure 2B:
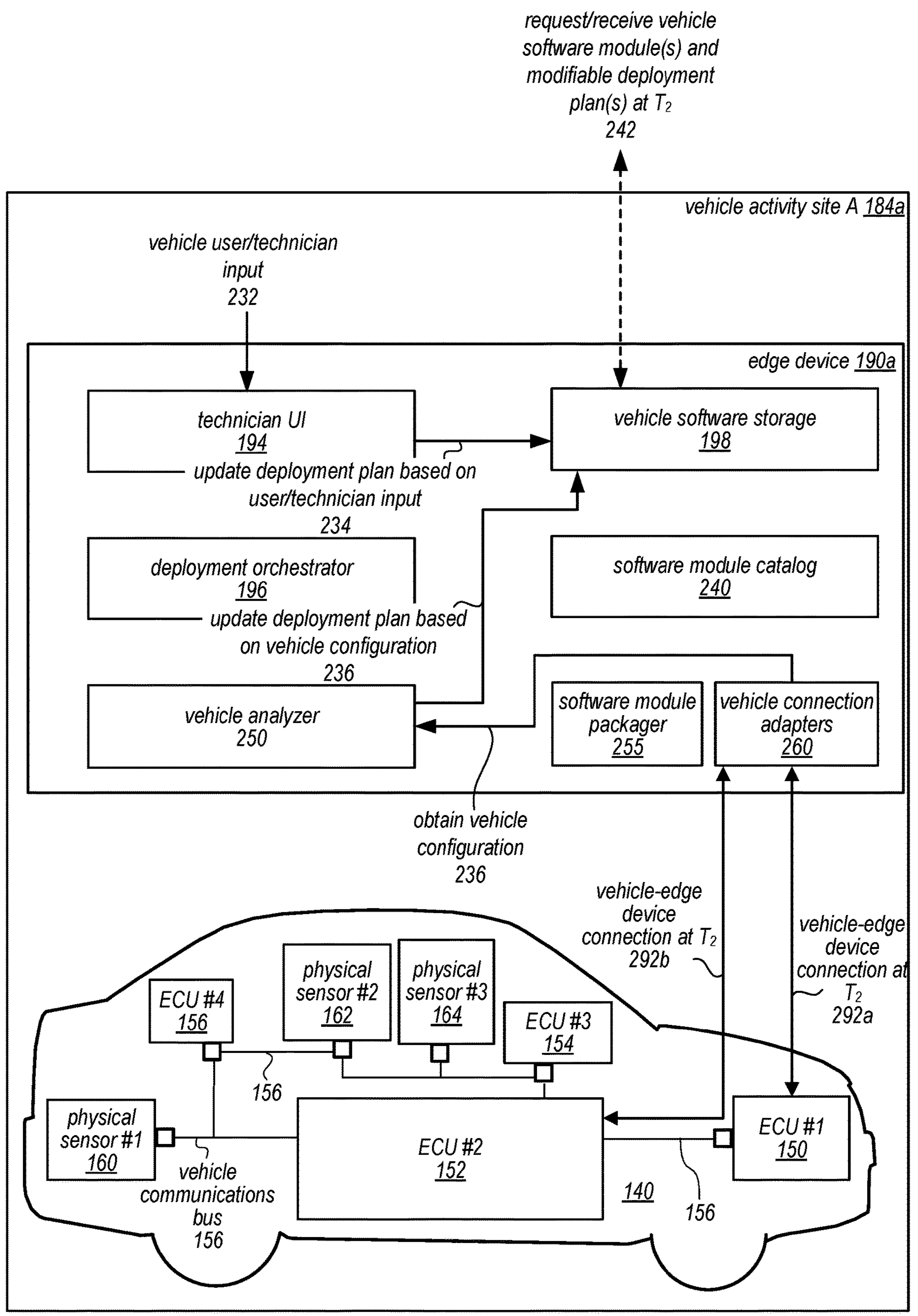
FIG. 2B illustrates a more detailed view of an edge device that modifies a stored modifiable deployment plan to update an ECU of a vehicle at a vehicle activity site, wherein the vehicle has insufficient network connectivity to perform the updating of an ECU of the vehicle remotely from the vehicle activity site, according to some embodiments.

FIG. 2B illustrates a more detailed view of an edge device that modifies a stored modifiable deployment plan to update an ECU of a vehicle at a vehicle activity site, wherein the vehicle has insufficient network connectivity to perform the updating of an ECU of the vehicle remotely from the vehicle activity site, according to some embodiments.

In some embodiments, the edge device 190*a* may be located at the vehicle activity site A 184*a* and may include a technician UI 194, the deployment orchestrator 196, the vehicle software storage 198, a software module catalog 240, a vehicle analyzer 250, a software module packager 255, and vehicle connection adapter(s) 260. The edge device 190*a* at $T_2$ may receive a vehicle user/technician input 232 via the technician UI 194. In some embodiments, the technician UI 194 may provide an interface to provide to vehicle user/technician a list of target ECUs for software module deployment, including selection from a list of available ECUs, or manual entry of ECU identifiers. The technician UI 194 may furthermore provide an interface to browse through a list of available vehicle software modules, search for modules by name or function, and/or select from predefined sets of modules for specific vehicle models to be deployed. In some embodiments, the technician UI 194 may allow indication or selection of options for configuring software module/ECU parameters, such as setting thresholds or ECU mode selection. For example, the technician UI 194 may provide a list of vehicle software modules available to be updated based on the available memory of ECU #1 150. The vehicle user/technician input 232 may provide an indication of the selection provided by the technician UI 194. In some embodiments, the vehicle user/technician input 232 may be a selection based on up-sell options and/or cross-sell options provided by the technician UI 194 to the vehicle user, wherein the options are available to be purchased. For example, the vehicle user/technician input 232 may be a selection of an advanced infotainment feature that is purchased by the vehicle user and, upon selection, may configure the edge device to deploy the relevant infotainment modules to ECU #1 150. Based on the received vehicle user/technician input 232, the modifiable deployment plan that was stored in the vehicle software storage 198 may be updated. For example, based on the vehicle user input 232 that selects the advanced infotainment feature for deployment, the edge device 190*a* may update the deployment plan based on the user/technician input 234 to deploy the advanced infotainment feature. In some embodiments, the technician UI 194 also provides an interface to receive appropriate security credentials, such as user authentication, and role-based access control. In some embodiments, the technician UI 194 may provide permissions management to ensure that only authorized technicians can access and deploy modules to ECUs. The technician UI 194 may furthermore provide diagnostic and troubleshooting features to the technician to identify issues during software module deployment, including providing deployment logs and errors.

In some embodiments, the vehicle connection adapters 260 may be used to provide connection to one or more ECUs of the vehicle 140. For example, the vehicle connection adapters 260 may provide connection to ECU #1 via an OBD-II (On-Board Diagnostics II) port of the vehicle and provide vehicle-edge device connection at $T_2$ 292*a* to ECU #1 150. In some embodiments, additional vehicle-edge connections may be formed, such as vehicle-edge device connection at $T_2$ 292*b* connected to ECU #2 152. In some embodiments, the vehicle-edge device connections may use different communication protocol such as CAN (Controller Area Network) or Ethernet protocol. In some embodiments, the vehicle-edge device connections may be wireless connections that use Wi-Fi protocol or other wireless communication protocols, such as Bluetooth. In some embodiments, the vehicle connection adapters 260 may be hand-held device(s) that may be connected to the edge device 190*a* and form vehicle-edge device connections at $T_2$ 292*a* 292*b* with the vehicle 140 via one or more protocols. In some embodiments, multiple hand-held devices may be connected to the edge device 190*a* physically and/or wirelessly and connected to the vehicle 140.

The vehicle analyzer 250 may obtain vehicle configuration 236 via the vehicle-edge device connections at $T_2$. In some embodiments, the vehicle analyzer 250 may sends queries or commands to the ECU to retrieve information about the ECU configuration of the vehicle 140. For example, the vehicle analyzer 250 may request information about the configuration of the ECUs of the engine, the transmission, the fuel system, the emissions components, the sensors, the actuators, and/or other systems of the vehicle 140. The vehicle configuration may include ECU type, model, parameter settings, service date, and other information relevant to modification of the deployment plan. The vehicle analyzer 250 may analyze the received vehicle configuration 236 and update the deployment plan based on the vehicle configuration 236. For example, the vehicle analyzer may determine that an older version of the software module is to be deployed based on the analysis that ECU #1 does not support the newer version of the software module.

In some embodiments, based on the updated deployment plan, the edge device 190*a* may request/receive additional vehicle software module(s) and modifiable deployment plan(s) at $T_2$ 242. For example, based on the vehicle analyzer 250 detecting a presence of an ECU that requires a critical safety patch, the edge device 190*a* may request additional vehicle software modules and updates to the modifiable deployment plan at $T_2$. In some embodiments, the vehicle user/technician input 232 and the vehicle configuration 236 may be sent to the vehicle software deployment management system to generate a new modifiable deployment plan, which is further discussed in FIG. 3.

Figure 2C:
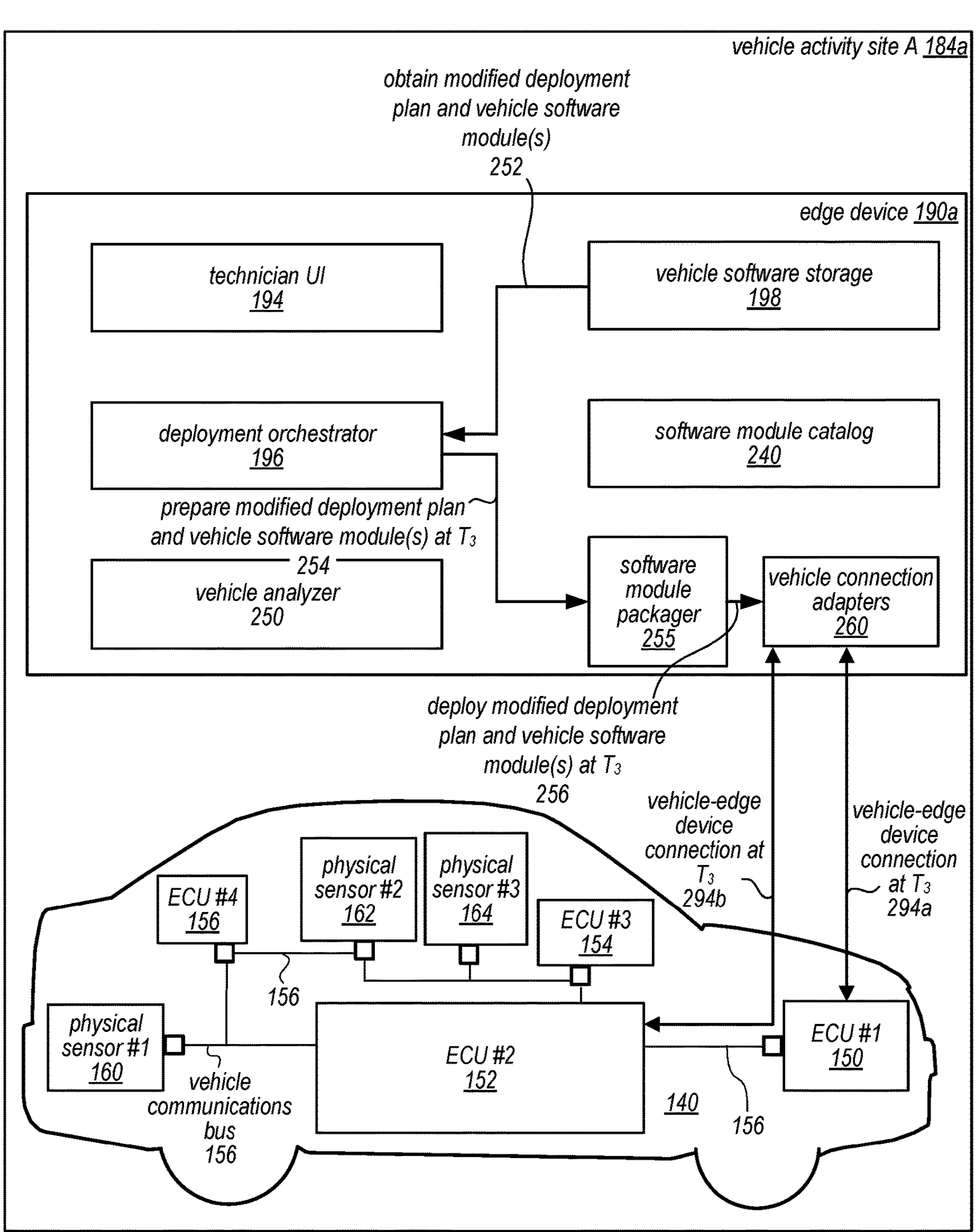
FIG. 2C illustrates a more detailed view of an edge device that prepares and deploys a vehicle software module based on a modified deployment plan to update an electronic control unit ECU of a vehicle at a vehicle activity site, wherein the vehicle has insufficient network connectivity to perform the updating of an ECU of the vehicle remotely from the vehicle activity site, according to some embodiments.

FIG. 2C illustrates a more detailed view of an edge device that prepares and deploys a vehicle software module based on a modified deployment plan to update an electronic control unit ECU of a vehicle at a vehicle activity site, wherein the vehicle has insufficient network connectivity to perform the updating of an ECU of the vehicle remotely from the vehicle activity site, according to some embodiments.

In some embodiments, at $T_3$, after the modifiable deployment plan has been updated (at $T_2$) based on the vehicle user/technician input from the technician UI 194 and the vehicle configuration from the vehicle analyzer, the deployment orchestrator 196 obtains the modified deployment plan and vehicle software module(s) 252 and sends them to the software module packager 255 to prepare the modified deployment plan and vehicle software module(s) at $T_3$ 256 for deployment at the vehicle.

In some embodiments, the deployment orchestrator 196 may sequence and initiate the execution of the updated deployment plan. In some embodiments, the software module packager 255 may assemble the necessary software artifacts of a given software module of the deployment plan into the image/file format supported by the vehicle and pertinent interface. For example, source code, libraries, configuration files, or other relevant files of the software module for deployment using the deployment plan may be compiled or packaged into a format that is supported by the vehicle and its pertinent interface (e.g., CAN bus protocol for CAN bus). The software module packager 255 may deploy the modified deployment plan vehicle software module(s) at $T_3$ via the vehicle connection adapters 260 and the vehicle-edge device connection at $T_3$ 294*a* and 294*b*.

Figure 3:
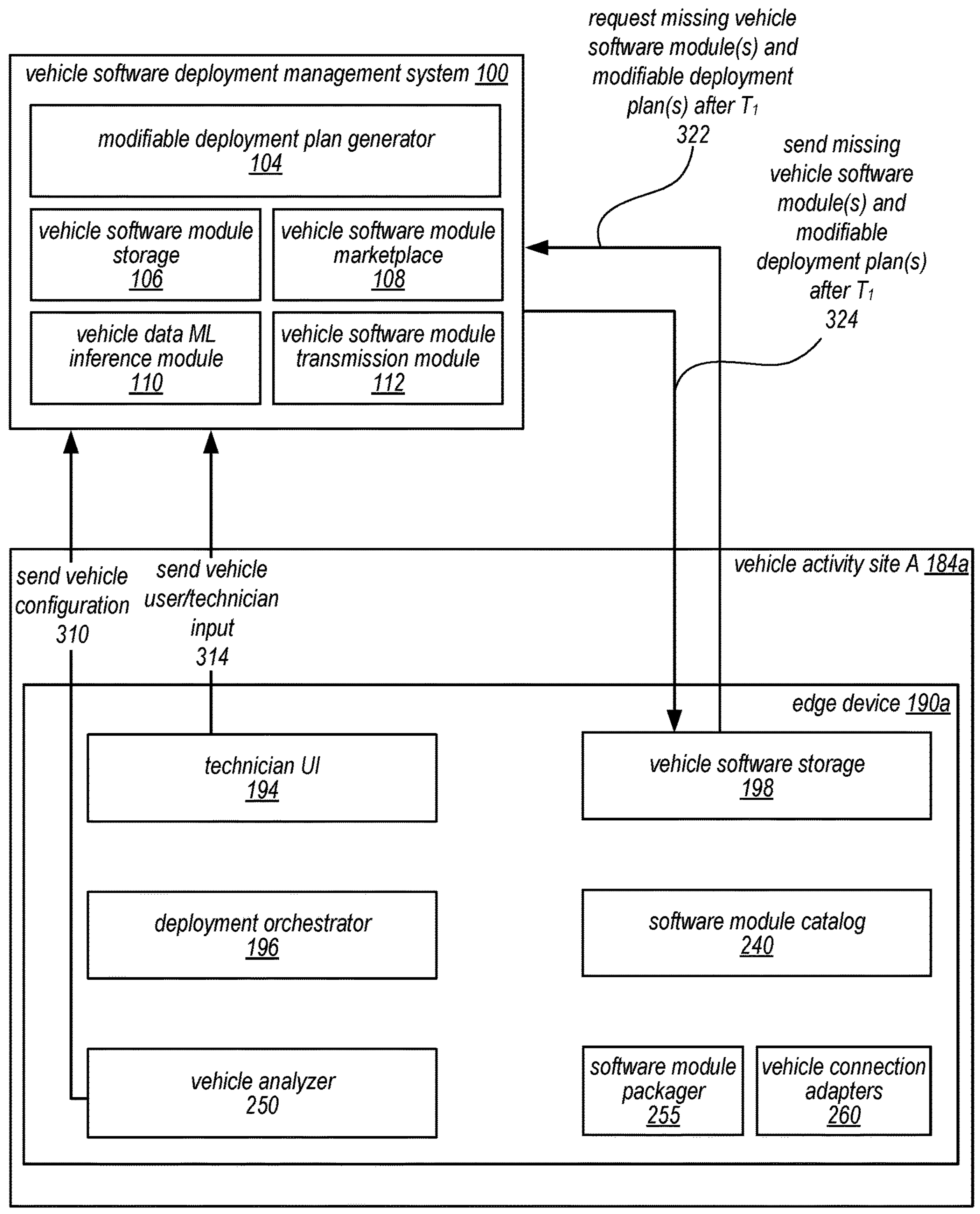
FIG. 3 illustrates a more detailed view of a cloud-based vehicle software deployment management system that provides missing vehicle software modules and updates to a modifiable deployment plan vehicle based on interaction between a vehicle and an edge device located at a vehicle activity site, according to some embodiments.

FIG. 3 illustrates a more detailed view of a cloud-based vehicle software deployment management system that provides missing vehicle software modules and updates to a modifiable deployment plan vehicle based on interaction between a vehicle and an edge device located at an activity site, according to some embodiments.

In some embodiments, based on the received vehicle user/technician input received from a user or technician at the technician UI 194 as described in FIG. 2B, the edge device 190*a* may send vehicle user/technician input 314 to the vehicle software deployment management system 100. Moreover, based on the vehicle configuration obtained by the vehicle analyzer 250, the edge device 190*a* may send the vehicle configuration to the vehicle software deployment management system 100. In some embodiments, the vehicle software deployment management system 100 may generate a new modifiable deployment plan to be sent to the edge device 190*a*. The vehicle configuration and the vehicle user/technician input may be used to determine a new modifiable deployment plan as determined by the vehicle software deployment management system 100. For example, based on the vehicle user input to deploy an automatic braking feature and a vehicle configuration that indicates excess computing capacity in the vehicle ECU #1, the vehicle software deployment management system 100 may generate a different modifiable deployment plan to use compute-heavy automatic braking sensor software modules (that may also require a different deployment sequence). In some embodiments, the modifiable deployment plan received at $T_1$ and the software modules may be missing one or more components needed to execute the newly determined deployment plan. In such situations, the edge device 190*a* may request missing vehicle software module(s) and modifiable deployment plan(s) after $T_1$ 322 and the vehicle software deployment management system 100 may send the missing vehicle software module(s) and modifiable deployment plan(s) after $T_1$ 324.

Figure 4:
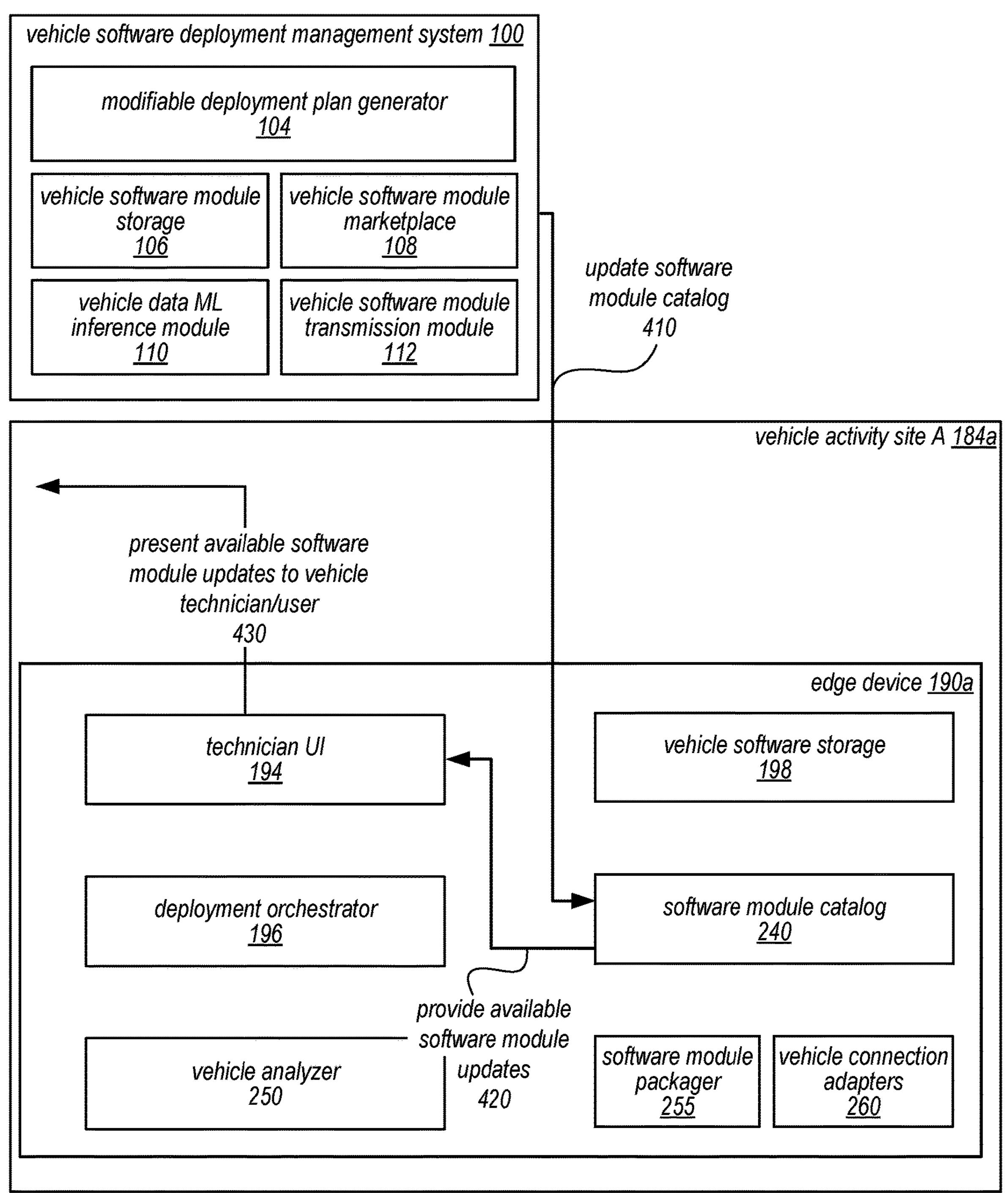
FIG. 4 illustrates a more detailed view of a cloud-based vehicle software deployment management system that updates available software modules in a software module catalog, wherein the software module catalog is presented to a vehicle technician/user at a vehicle activity site where a vehicle is located, wherein the vehicle has insufficient network connectivity to perform an update of an ECU of the vehicle remotely from the vehicle activity site, according to some embodiments.

FIG. 4 illustrates a more detailed view of a cloud-based vehicle software deployment management system that updates available software modules in a software module catalog, wherein the software module catalog is presented to a vehicle technician and/or a user at a vehicle activity site for a vehicle having insufficient network connectivity to perform an update of an ECU of the vehicle remotely from a vehicle activity site, according to some embodiments.

In some embodiments, based on vehicle configuration and/or vehicle user/technician input provided by the edge device 190*a* to the vehicle software deployment management system 100, the vehicle software deployment management system 100 may further update the software module catalog 240 at $T_2$. In some embodiments, the vehicle software deployment management system 100 may receive additional information (via the vehicle user or another vehicle information source) before $T_2$ wherein the vehicle 140 has not yet arrived (or been connected to the edge device 190*a*) at the activity site A 184*a*. The vehicle software module catalog 240 may be a comprehensive database or inventory of software modules that are available to be deployed to the vehicle 140. For example, the vehicle software deployment management system 100 may determine that a software module for an infotainment system is already deployed in the vehicle and remove that software module from the software module catalog for that particular vehicle. In some embodiments, the vehicle software deployment management system 100 may determine that additional software modules are available to be deployed to the vehicle 140 and update the software module catalog 240 with the newly available software modules. In some embodiments, the software module catalog may be updated based on received vehicle user/technician input and/or vehicle configuration provided by the edge device 190*a* as discussed in FIG. 2B and FIG. 3. Once the software module catalog 240 has been updated, the technician UI 194 may present available software module updates to the vehicle technician and/or user 430 that reflect the updated software catalog.

Figure 5A:
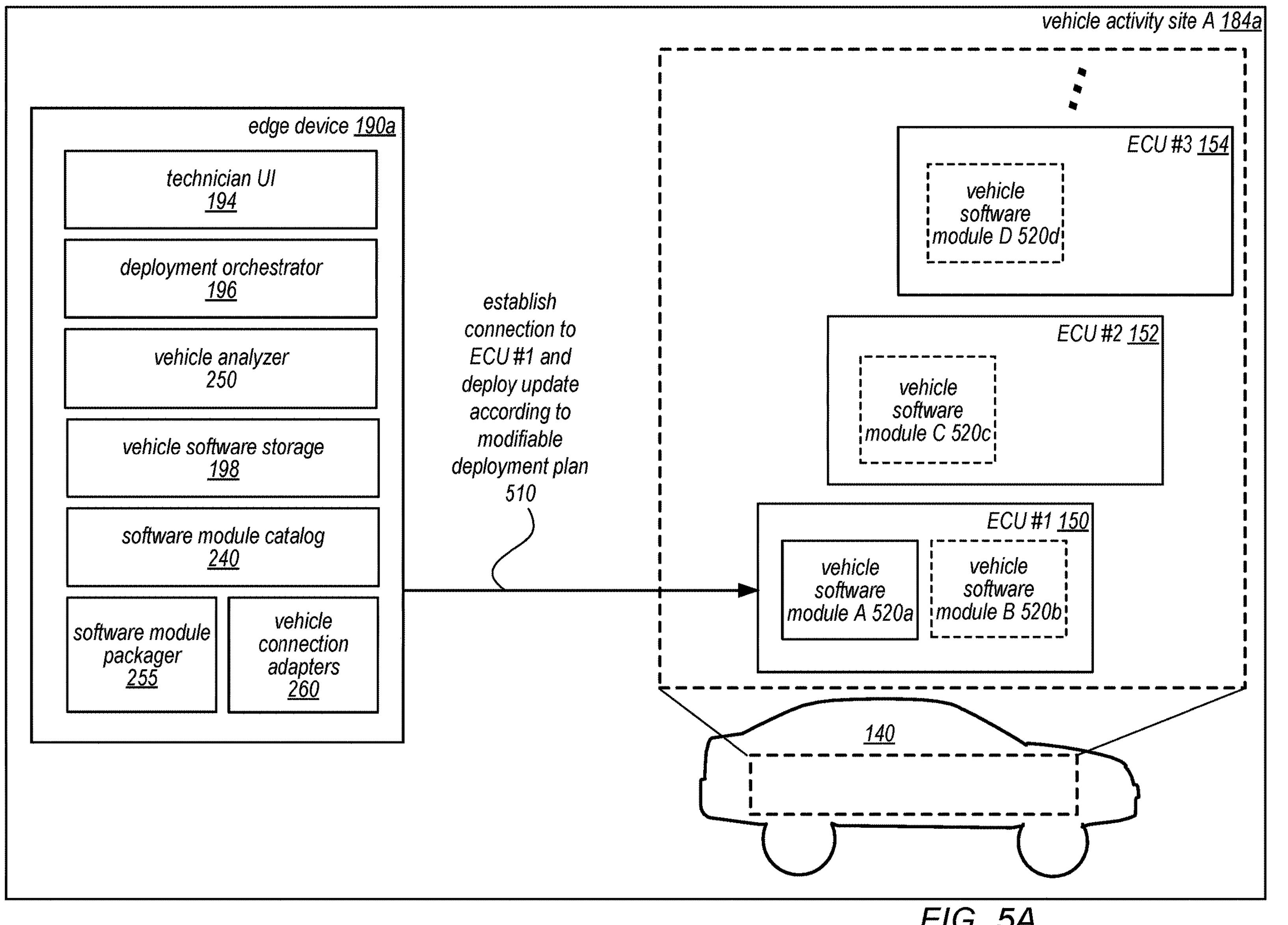
FIG. 5A illustrates a more detailed view of an edge device at a vehicle activity site that establishes a connection to an ECU of a vehicle and deploys the update at the ECU according to a modifiable deployment plan, according to some embodiments.

FIG. 5A illustrates a more detailed view of an edge device at an activity site that establishes a connection to an ECU of a vehicle and deploys the update at the ECU according to a modifiable deployment plan, according to some embodiments.

In some embodiments, the modifiable deployment plan may indicate that the software update includes deployment of vehicle software module A 520*a*, vehicle software module B 520*b*, vehicle software module C 520*c*, and vehicle software module D 520*d* be deployed in the listed sequence and at specified ECUs, wherein the vehicle software module A 520*a* and vehicle software module B 520*b* are to be deployed at ECU #1 150, vehicle software module C 520*c* deployed at ECU #2 152, and vehicle software module D 520*d* are to be deployed at ECU #3 154. In some embodiments, the edge device 190*a* may establish connection to ECU #1 and deploy a software update according to a modifiable deployment plan 510. In some embodiments, the deployment sequence may be a certified deployment sequence that has been tested, reviewed, and validated as having successfully met a certification requirement. In some embodiments, the deployment of the software modules may be required to conform to the certified sequence, as the sequence is an authorized sequence to ensure safety, wherein the certified deployment sequence indicates a correct order that minimizes the risk of errors, inconsistencies, or failures that may result from deploying components out of sequence.

Figure 5B:
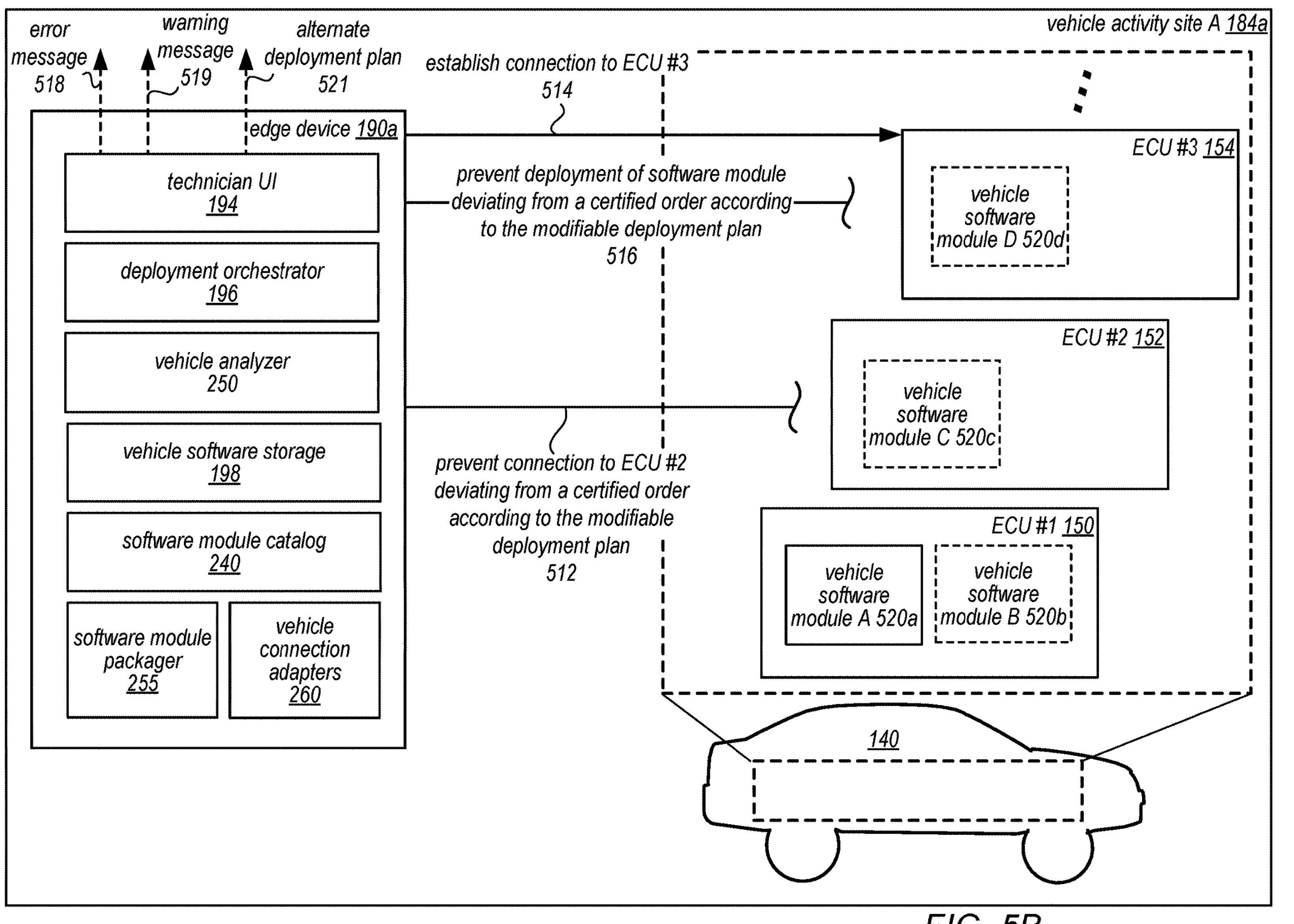
FIG. 5B illustrates a more detailed view of an edge device at a vehicle activity site that prevents deployment of one or more software modules in an order that deviates from a certified order for installing software modules according to the modifiable deployment plan, according to some embodiments.

FIG. 5B illustrates a more detailed view of an edge device at a vehicle activity site that prevents deployment of a software module deviating from a certified order for installing software modules according to the modifiable deployment plan, according to some embodiments.

In some embodiments, the edge device 190*a* may attempt to deploy the vehicle software module C 520*c* at ECU #2 152 before deploying vehicle software module B 520*b* at ECU #1 150. In some embodiments, the out-of-sequence deployment may be initiated by a technician via the technician UI 194 that allows, at least in part, manual control over the deployment process. In some embodiments, the edge device 190*a* may detect the out-of-sequence deployment request and prevent connection and/or deployment to ECU #2 deviating from a certified order according to the modifiable deployment plan 512. For example, based on a determination that according to the deployment plan that the vehicle software module B 520*b* is to be deployed at ECU #1 150 and not vehicle software module C 520*c* at ECU #2 152, the edge device 190*a* may prevent a request by the technician to connect wirelessly to ECU #2.

In some embodiments, although a physical connection has been made to an ECU for deployment of an out-of-sequence vehicle software module, the edge device 190*a* may prevent deployment of the software module. For example, the edge device 190*a* may establish a connection to ECU #3 514. However, based on the edge device 190*a* determining that vehicle software module B 520*b* is to be deployed at ECU #1, the edge device 190*a* may prevent deployment of the software module (e.g., vehicle software module D 520*d*) that deviates from a certified order according to the modifiable deployment plan 516. In some embodiments, despite a physical connection being established between the edge device 190*a* and an ECU, network traffic may be stopped based on the determination that the software module to be deployed (or ECU connection) is out-of-sequence. In some embodiments, the edge device 190*a* may prevent instructions for out-of-sequence deployment from being executed. In some embodiments, the technician UI 194 may provide an error message 518 to indicate that the out-of-sequence deployment has been prevented. The error message 518 may indicate that the deployment has failed due to the incorrect order of deployment steps or components and indicate the correct module and deployment sequence that is according to the certified order. In some embodiments, the edge device 190*a* may perform the out-of-sequence deployment of the vehicle software module, and may send a warning message 519 indicating that the deployment is contrary to the certified order of deployment steps. In some embodiments, the warning message 519 may include further details regarding the correct deployment plan from which the technician is deviating such as an expected software module to be deployed next, the ECU to deploy to, whether the out of sequence deployment will invalidate a certification, etc. In some embodiments, technician UI 194 may provide an alternate deployment plan 521 that accommodates the out-of-sequence deployment. For example, the edge device 190*a* may receive instructions to deploy the software module D 520*d* that deviates from a certified order. Based on that instruction, the edge device 190*a* may generate an alternate deployment plan for which deployment of the software module D 520*d* would be the correct sequence to comply with certification. The technician UI 194 may provide the alternate deployment plan 521 to the technician for approval.

Figure 6:
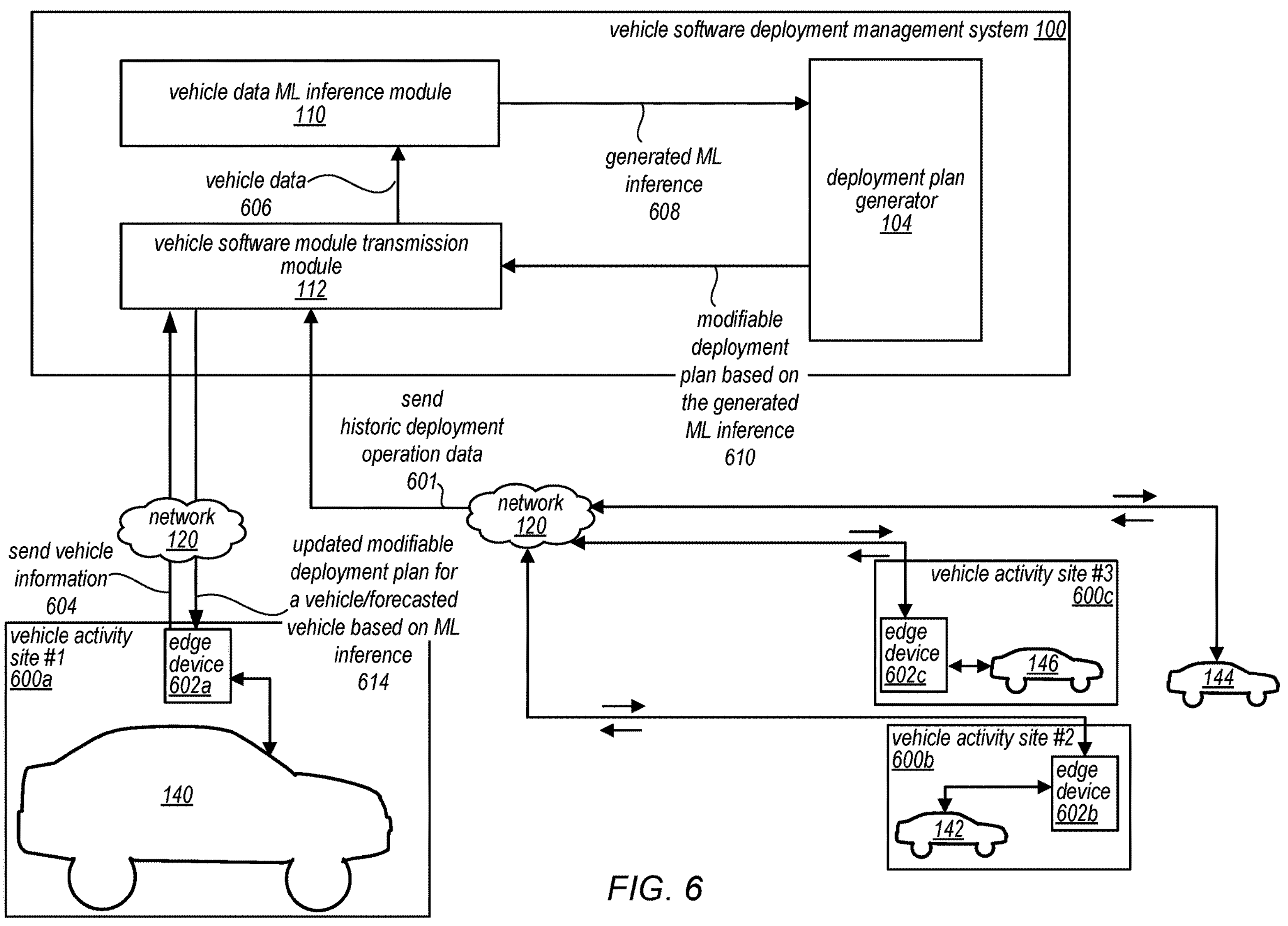
FIG. 6 illustrates a cloud-based vehicle software deployment management system configured to generate modifiable deployment plans for deploying vehicle software modules based on various vehicle/vehicle fleet deployment operation data and machine learning (ML) models, according to some embodiments.

FIG. 6 illustrates a cloud-based vehicle software deployment management system configured to generate modifiable deployment plans for deploying vehicle software modules based on various vehicle/vehicle fleet deployment operation data and machine learning (ML) models, according to some embodiments.

In some embodiments, various edge devices 602*a*, 602*b*, 602*c* at respective vehicle activity sites #1, #2, and #3 600*a*, 600*b*, and 600*c* may send historical deployment operation data 601 over the network 120 to the vehicle application transmission module 112. In some embodiments, the historic deployment operation data 601 may be data gathered by an edge device pertaining to the deployment process, including error messages, deployment failures, deployment successes, deployment operations at which a vehicle ECU became inoperable, etc. In some embodiments, the historical deployment operation data 601 may include data regarding vehicle activity at the vehicle activity site without an explicit appointment at the respective vehicle activity sites #1, #2, and #3 600*a*, 600*b*, and 600*c*. For example, the historical deployment operation data 601 may indicate models of the vehicles that have arrived at the vehicle activity sites #1. #2, and #3 600*a*, 600*b*, and 600*c*, ECU configurations of the vehicles, time/duration of the activity, and/or the vehicle software modules that were requested to be deployed, etc. This may be used to forecast future vehicle arrivals at the vehicle activity site. Subsequent to receiving the historic deployment operation data 601, the vehicle application transmission module 112 may send vehicle data 606 to the vehicle data ML inference module 110 that generates ML inferences 606. The generated ML inferences 606 may be used by the deployment plan generator 104 to determine the optimal application deployment configuration and generate deployment plans. In some embodiments, the ML inferences 606 may be forecasts of vehicle activities likely to occur at the vehicle activity sites and may be used by the deployment plan generator 104 to determine respective modifiable deployment plans to pre-cache at the various edge devices 602*a*, 602*b*, 602*c*. For example, based on ML inference 606 (that forecasts a vehicle of a make "A" and model "B" as a likely candidate to arrive at the vehicle activity sites #1 600*a*) the deployment plan generator 104 may generate a modifiable deployment plan to pre-cache at the edge device 602*a*. In some embodiments, forecasts for vehicle activities may be used to perform software recalls. For example, historical patterns or seasonality may be used to determine a particular vehicle activity site, such as a given one or more of vehicle activity sites 600*a*, 600*b*, and 600*c*, that is likely to be visited by a vehicle with an active software recall outstanding. In such a case, software modules needed to perform the software recall may be pre-cached at edge devices located at the vehicle activity sites that are likely to be visited by vehicles with the active software recall.

In some embodiments, using the vehicle data 606 from the fleet, the vehicle data ML inference module may train one or more ML models to generate one or more ML inferences. For example, based on the vehicle data 606, the trained ML model may make an inference indicating a negative impact of deployment of a particular application to a particular ECU environment. For example, based on an ML inference that a deployment of a first software module to an ECU of a first type results in the ECU becoming inoperable, the modifiable deployment plan generator 104 may generate a modifiable deployment plan that deploys the first software module to an ECU of a second type. The modifiable deployment plan generator 104 may use the ML inference to generate and send a deployment plan based, at least in part, on the generated ML inference 610. The vehicle application transmission module 112 may send the updated modifiable deployment plan for a vehicle/forecasted vehicle based on the ML inference 614 as discussed in FIGS. 1-3. In some embodiments, the vehicle data ML inference module 110 may train the one or more ML models based on current vehicle information 604 sent from the vehicle 140.

FIG. 7 illustrates a flowchart of operations performed by an edge device that receives and modifies a vehicle software module and modifies a modifiable deployment plan for updating the ECU of a vehicle at a future time, wherein the vehicle has insufficient network connectivity to perform the updating of an ECU of the vehicle remotely from the vehicle activity site, according to some embodiments. In some embodiments, the modifiable deployment plan may be generated based on vehicle information, such as vehicle make, model, and custom features, obtained prior to the servicing of the vehicle at the vehicle activity site discussed in FIGS. 1 and 2A-2C.

At block 710, the edge device receives a deployment plan generated by a cloud-based vehicle software deployment management system for deploying software modules on electronic control units (ECUs) of a vehicle that has insufficient network connectivity to perform updating of the software modules remotely from a vehicle activity.

At block 720, the edge device may modify the received deployment plan configured to be modified based on inputs determined at the future time when the vehicle is at the vehicle activity site. For example, as discussed in FIG. 2B, the received inputs may be vehicle information such as ECU configuration obtained by a vehicle analyzer and/or may be vehicle user/technician inputs from a technician UI.

Figure 8:
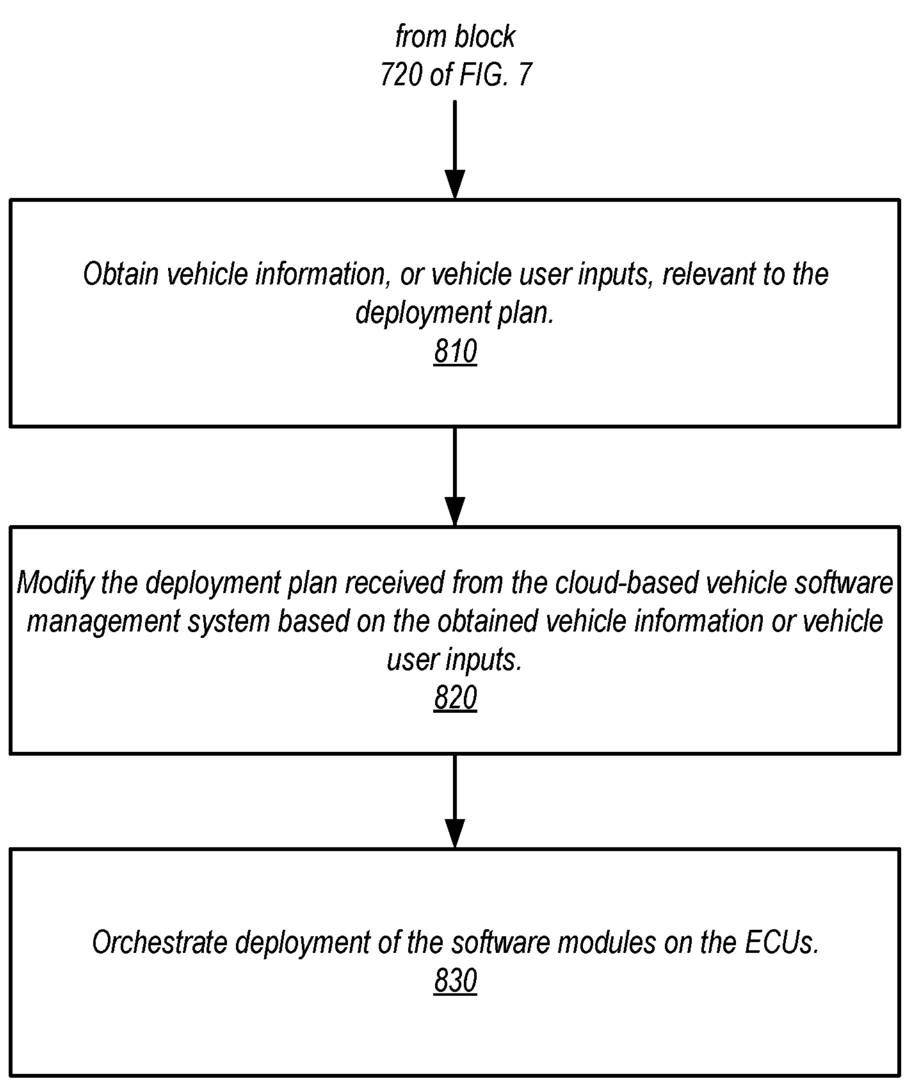
FIG. 8 illustrates a flowchart of operations performed by an edge device that obtains vehicle information and vehicle user inputs, modifies a modifiable deployment plan, and orchestrates deployment of software modules based on the modified deployment plan, according to some embodiments.

FIG. 8 illustrates a flowchart of operations performed by an edge device that obtains vehicle information and vehicle user inputs, modifies a modifiable deployment plan, and orchestrates deployment of software modules based on the modified deployment plan, according to some embodiments.

At block 810, an edge device may obtain vehicle information, or vehicle user inputs, relevant to a deployment plan. In some embodiments, vehicle information obtained may be ECU type, model, parameter settings, service date, and other information relevant to modification of the deployment plan as discussed in FIG. 2B. In some embodiments, the vehicle user inputs may be selection based on up-sell options and/or cross-sell options provided by the technician UI to the vehicle user to be purchased as discussed in FIG. 2B.

At block 820, the edge device may modify the deployment plan received from the cloud-based vehicle software management system based on the obtained vehicle information or vehicle user inputs. In some embodiments, the modification of the deployment plan may be a change in deployment procedure, change in software modules to be deployed, or receipt of a new deployment plan from the cloud-based vehicle software management system as discussed in FIG. 2B.

At block 830, the edge device may orchestrate deployment of the software modules on the ECUs. In some embodiments, the edge device may determine that a vehicle software module to be deployed is out-of-sequence according to a certified order from the modifiable deployment plan, and may prevent deployment of software module that deviates from the certified order as discussed in FIGS. 5A-5B.

Example Computer System

Figure 9:
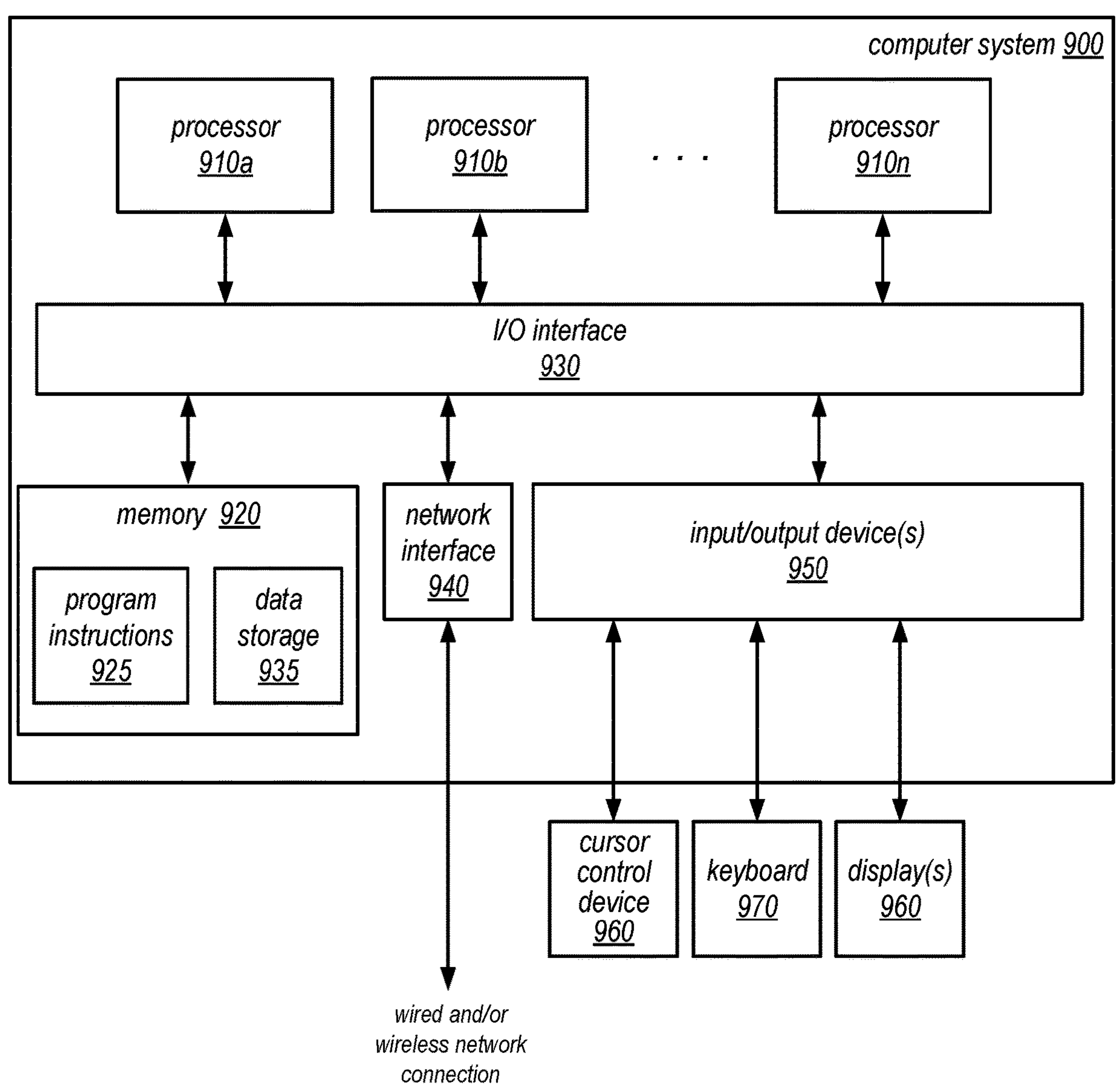
FIG. 9 illustrates a block diagram illustrating an example computer system that implements some or all of the techniques described herein, according to some embodiments.

Any of various computer systems may be configured to implement processes associated with a vehicle software deployment management system, edge device, ECUs, an operating system in a vehicle or device, or any other component of the above figures. For example, FIG. 9 illustrates a block diagram illustrating an example computer system that implements some or all of the techniques described herein, according to some embodiments. In various embodiments, the vehicle software deployment management system, the provider network that implement the vehicle software deployment management system and other cloud services, the operating system in a vehicle or device, or any other component of the above figures FIGS. 1-8 may each include one or more computer systems 900 such as that illustrated in FIG. 9.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or that provide a downloadable application, while in other embodiments, servers may include more, fewer, or different elements than computer system 900.

In various embodiments, computing device 900 may be a uniprocessor system including one processor or a multiprocessor system including several processors 910*a*-910*n* (e.g., two, four, eight, or another suitable number). Processors 910*a*-910*n* may include any suitable processors capable of executing instructions. For example, in various embodiments, processors 910*a*-910*n* may be processors implementing any of a variety of instruction set formats (ISAs), such as the x86, PowerPC, SPARC, or MIPS ISAs, or any other suitable ISA. In some embodiments, processors 910*a*-910*n* may include specialized processors such as graphics processing units (GPUs), application specific integrated circuits (ASICs), etc. In multiprocessor systems, each of processors 910*a*-910*n* may commonly, but not necessarily, implement the same ISA.

System memory 920 may be configured to store program instructions and data accessible by processor(s) 910*a*-910*n*. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code (e.g., program instructions) 925 and data storage 935.

In one embodiment, I/O interface 930 may be configured to coordinate I/O traffic between processors 910*a*-910*n*, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, I/O interface 930 may include support for devices attached via an automotive CAN bus, etc. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processors 910*a*-910*n*.

In some embodiments, the network interface 940 may be coupled to I/O interface 930, and one or more input/output devices 950, such as cursor control device 960, keyboard 970, and display(s) 980. In some cases, it is contemplated that embodiments, may be implemented using a single instance of computer system 900, while in other embodiments, multiple such computer systems, or multiple nodes making up computer system 900, may be configured to host different portions or instances program instructions as described above for various embodiments. For example, in one embodiment some elements of the program instructions may be implemented via one or more nodes of computer system 900 that are distinct from those nodes implementing other elements.

Network interface 940 may be configured to allow data to be exchanged between computing device 900 and other devices associated with a network or networks. In various embodiments, network interface 940 may support communication via any suitable wired or wireless general data networks, such as types of Ethernet networks, cellular networks, Bluetooth networks, Wi-Fi networks, Ultra-wideband Networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 900 via I/O interface 930. One or more non-transitory computer-readable storage media may also include any volatile or non-volatile media such as RAM (e.g., SDRAM, DDR SDRAM, RDRAM, SRAM, etc.), ROM, etc., that may be included in some embodiments of computing device 900 as system memory 920 or another type of memory. Further, a computer-readable medium may include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or nonvolatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more computing devices configured to implement a cloud-based vehicle software deployment management system configured to:

determine a vehicle activity is to be performed for a vehicle at a vehicle activity site at a future time, wherein:

the vehicle comprises one or more electronic control units (ECUs) to be updated; and the vehicle has insufficient network connectivity to perform the updating of the ECUs remotely from the vehicle activity site;

generate, prior to the future time, a deployment plan for deploying one or more software modules on the one or more ECUs via a connection to be established between an edge device located at the vehicle activity site and the vehicle; and provide, prior to the future time, the generated deployment plan to the edge device located at the vehicle activity site, wherein the generated deployment plan is configured to be modified based, at least in part, on one or more inputs determined at the future time when the vehicle is at the vehicle activity site.

2. The system of claim 1, further comprising:

the edge device located at the vehicle activity site, wherein the edge device is configured to:

obtain the one or more inputs, wherein the one or more inputs comprise vehicle information or vehicle user inputs, relevant to the deployment plan;

modify the deployment plan received from the cloud-based vehicle software management system based on the obtained vehicle information or vehicle user inputs; and orchestrate deployment of the one or more software modules on the one or more ECUs.

3. The system of claim 1, wherein the edge device is configured to:

receive, at the edge device, prior to the future time, the deployment plan, wherein the deployment plan comprises instructions for deploying the one or more software modules on the one or more ECUs of the vehicle; and store, at the edge device, prior to the future time, the one or more software modules, wherein the one or more software modules are received with the deployment plan, or have been previously cached at the edge device.

4. The system of claim 1, wherein, to determine that the vehicle activity is to be performed at the vehicle activity site at the future time, the cloud-based vehicle software deployment management system is configured to:

receive an indication that a vehicle activity appointment has been scheduled for the vehicle at the activity site; and wherein the cloud-based vehicle software deployment management system is configured to:

perform the generating of the deployment plan prior to the future time based on a date or time of the scheduled vehicle activity appointment included in the indication.

5. The system of claim 1, wherein the cloud-based vehicle software deployment management system configured to:

receive or access, prior to the future, vehicle information indicating:

a vehicle model, a year of the vehicle model, a selected vehicle software application for deployment, ECU types or configurations of the vehicle, or parameter settings for the ECUs of the vehicles wherein the generation of the deployment plan is performed based, at least in part, on the received or accessed vehicle information.

6. The system of claim 1, wherein the cloud-based vehicle software deployment management system is configured to:

generate a forecast of one or more vehicles forecast to be at the vehicle activity site at the future time; and select one or more software modules to pre-cache at the edge device based on the generated forecast.

7. A method, comprising:

receiving, at an edge device located at a vehicle activity site, a deployment plan generated by a cloud-based vehicle software deployment management system for deploying one or more software modules on one or more electronic control units (ECUs) of a vehicle, wherein the deployment plan is received at the edge device prior to the vehicle arriving at the vehicle activity site;

establishing, while the vehicle is located at the vehicle activity site, a connection between the edge device and the vehicle;

modifying the received deployment plan based, at least in part, on one or more inputs determined while the vehicle is at the vehicle activity site, wherein the received deployment plan is configured to be modified based, at least in part, on the one or more inputs determined at the vehicle activity site; and orchestrating deployment of the one or more software modules on the one or more ECUs using the modified deployment plan.

8. The method of claim 7, further comprising:

obtaining, while the vehicle is located at the vehicle activity site, vehicle information or vehicle user inputs, relevant to the deployment plan received from the cloud-based vehicle software management system; and wherein:

said modifying the received deployment plan is based on the obtained vehicle information or vehicle user inputs.

9. The method of claim 7, further comprising:

receiving at the edge device, prior to the vehicle arriving at the vehicle activity site, one or more software artifacts required for deploying the one or more software modules on the ECUs of the vehicle based on the deployment plan; and storing at the edge device, prior to the vehicle arriving at the vehicle activity site, the one or more received software artifacts, wherein the edge device orchestrates the deployment of the one or more software on the one or more ECUs using the stored one or more software artifacts at the future time.

10. The method of claim 7, wherein at least a portion of the modified deployment plan is generated by the edge device in addition to the deployment plan received from the cloud-based vehicle software deployment management system.

11. The method of claim 7, further comprising:

obtaining vehicle user inputs relevant to the deployment plan via a user interface of the edge device, wherein the user interface is configured to:

indicate one or more ECUs available for update in the vehicle, receive permission to overcome security restrictions of the ECUs, and indicate steps for a technician to perform a workflow of the deployment plan.

12. The method of claim 7, wherein the edge device is configured to connect wirelessly to one or more handheld devices and the connection to be established between the edge device and the vehicle occurs via the one or more handheld devices.

13. The method of claim 7, further comprising:

determining, using the edge device and the connection between the edge device and the vehicle, respective deployment progress of deployment of the one or more software modules on the one or more ECUs of the vehicle.

14. The method of claim 13, further comprising:

receiving one or more deployment failures identified in the respective deployment progress; and modifying the deployment plan based on the one or more deployment failures identified in the respective deployment progress.

15. The method of claim 7, further comprising:

receiving, at the cloud-based vehicle software deployment management system, one or more instances of vehicle information provided by a user of the vehicle the one or more instances of vehicle information comprising: a vehicle model, a year of the vehicle model, selected vehicle software application for deployment, ECUs of the vehicle, or parameter settings for the ECUs of the vehicles.

16. The method of claim 7, wherein the activity site is a vehicle service station, and wherein the edge device is configured to provide connectivity to the vehicle.

17. The method of claim 7, wherein the activity site is a charging station, and wherein the edge device is configured to provide connectivity to the vehicle.

18. The method of claim 7, wherein the edge device is configured to perform one or more of:

preventing out-of-sequence deployment of a component of the software module based on the deployment plan;

presenting a certified deployment sequence for the component of the software module; or providing an alternate deployment plan.

19. One or more non-transitory, computer-readable storage media, storing program instructions that when executed on or across one or more processors cause the one or more processors to:

determine a vehicle activity is to be performed for a vehicle at a vehicle activity site at a future time, wherein:

the vehicle activity comprises updating one or more electronic control units (ECUs) of the vehicle;

generate, prior to the future time, a deployment plan for deploying one or more software modules on the one or more ECUs of the vehicle via a connection to be established between an edge device located at the vehicle activity site and the vehicle; and provide, prior to the future time, the generated deployment plan to the edge device located at the vehicle activity site, wherein the generated deployment plan is configured to be modified based, at least in part, on one or more inputs determined at the future time when the vehicle is at the vehicle activity site.

20. The one or more non-transitory, computer-readable storage media of claim 19, wherein the program instructions, when executed on or across the one or more processors, cause the one or more processors to:

determine, using the edge device connected to the vehicle, a vehicle configuration comprising one or more of a software configuration of the vehicle or a hardware configuration of the vehicle;

provide the vehicle configuration to be sent to the cloud-based vehicle software deployment management system; and generate or update, using the cloud-based vehicle software deployment management system, a vehicle configuration graph for the vehicle based on the vehicle configuration.

* * * * *